United States Patent
Nagai et al.

[11] Patent Number: 6,118,255
[45] Date of Patent: Sep. 12, 2000

[54] CHARGING APPARATUS, SECONDARY BATTERY APPARATUS, CHARGING SYSTEM, AND CHARGING METHOD

[75] Inventors: Tamiji Nagai; Toshitaka Takei, both of Kanagawa; Kuniharu Suzuki, Tokyo, all of Japan

[73] Assignee: Sony Corporation, Tokyo, Japan

[21] Appl. No.: 09/192,138

[22] Filed: Nov. 13, 1998

[30] Foreign Application Priority Data

Nov. 18, 1997 [JP] Japan .................................. 9-316888

[51] Int. Cl.⁷ ........................................................ H02J 7/00
[52] U.S. Cl. .......................... 320/152; 320/162; 320/112
[58] Field of Search .................................. 320/112, 107, 320/151, 152, 153, 162

[56] References Cited

U.S. PATENT DOCUMENTS

| | | | |
|---|---|---|---|
| 5,600,230 | 2/1997 | Dunstan | 340/636 |
| 5,744,937 | 4/1998 | Cheon | 320/125 |
| 5,764,030 | 6/1998 | Gaza | 320/116 |
| 5,926,007 | 7/1999 | Okada | 320/132 |
| 5,994,875 | 11/1999 | Lee | 320/132 |
| 5,994,878 | 11/1999 | Ostergaard et al. | 320/132 |

*Primary Examiner*—Peter S. Wong
*Assistant Examiner*—Gregory J. Toatley, Jr.
*Attorney, Agent, or Firm*—Jay H. Maioli

[57] ABSTRACT

An over-charging voltage is supplied from a voltage detecting circuit 39 to a priority controlling circuit 46 and a switch circuit 43. A voltage detecting circuit 41 detects a terminal voltage of a secondary battery BT (namely, an over-charging voltage) and supplies the voltage to the switching circuit 43. A current that flows in a resistor 42 is supplied to a cumulating circuit 40 and the switch circuit 43. The cumulating circuit 40 adds a voltage received from the voltage detecting circuit 39 through the priority controlling circuit 46 and a current that flows in the resistor 42 and supplies the added result as a control signal to a charging portion PS. A temperature detecting circuit 44 detects the temperature of a battery pack BP. The detected result is supplied to the switch circuit 43 and a detected voltage switching circuit 45. The switch circuit 43 performs on/off operations corresponding to the received voltage, terminal voltage, current, and temperature. The detected voltage switching circuit 45 switches the voltage of the voltage detecting circuit 39 corresponding to the detected result of the temperature.

7 Claims, 24 Drawing Sheets

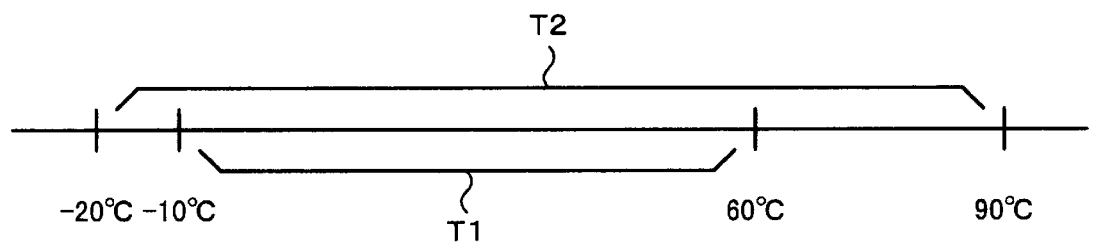
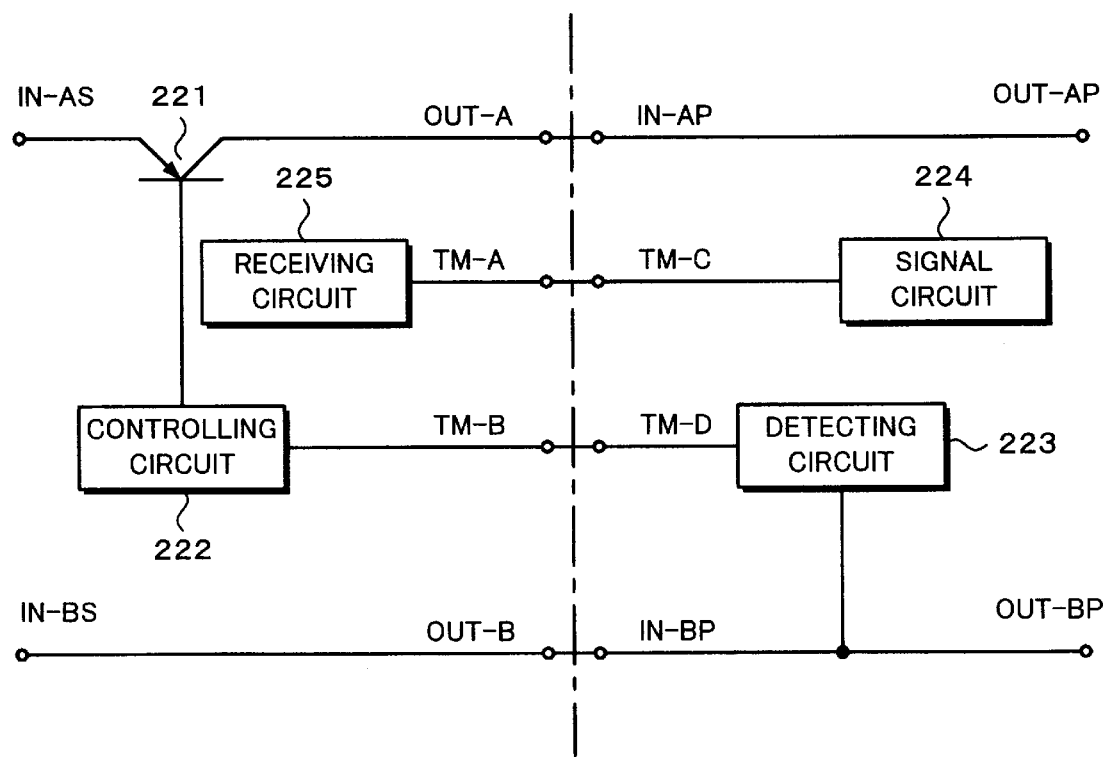

CHARGING APPARATUS, SECONDARY BATTERY APPARATUS, CHARGING SYSTEM, AND CHARGING METHOD

BACKGROUND OF THE INVENTION

1. Field of the Invention

The present invention relates to a charging apparatus, a secondary battery apparatus, a charging system, and a charging method that allow a signal to be exchanged between the charging apparatus and the secondary battery apparatus.

2. Description of the Related Art

In recent years, a secondary battery for a power supply has been used for a portable electronic unit such as a portable telephone unit or a VCR that is equipped with a camera. When such a portable electronic unit is used, the secondary battery thereof should be charged. When the secondary battery is charged by a charging apparatus, the battery voltage and charging current are detected so as to determine whether the secondary battery is fully charged by the charging apparatus.

Depending on the characteristics of a secondary battery, the temperature thereof should be detected in addition to the battery voltage and charging current. The secondary battery has a chargeable temperature range. When the secondary battery is charged out of the chargeable temperature range, the characteristics thereof deteriorate. To prevent such a situation, such a secondary battery has a temperature detecting sensor. The charging apparatus can obtain the detected result of the temperature detecting sensor.

The chargeable temperature range of a secondary battery is different from the dischargeable temperature range thereof. For example, as shown in FIG. 1, the chargeable temperature range T1 of a lithium-ion battery is from around $-10°$ C. to around $60°$ C., whereas the dischargeable temperature range T2 thereof is from around $-20°$ C. to around $90°$ C. When a secondary battery is charged out of the chargeable temperature range T1 or discharged out of the dischargeable temperature range T2, the characteristics thereof deteriorate.

FIG. 2 is a block diagram showing the structure of a charging system having a charging portion and a secondary battery portion. The charging portion and the secondary battery portion are connected so as to exchange a signal. The secondary battery portion is hereinafter referred to as battery pack. In FIG. 2, the charging portion is composed of a PNP type transistor 221, a controlling circuit 222, and a receiving circuit 225. The battery pack is composed of a detecting circuit 223 and a signal circuit 224. A DC power is supplied from input terminals IN-AS and IN-BS. The input terminal IN-AS is connected to the emitter of the transistor 221. The collector of the transistor 221 is connected to the output terminal OUT-A. The base of the transistor 221 is connected to the controlling circuit 222. The controlling circuit 222 is connected to a terminal TM-B. The receiving circuit 225 is connected to a terminal TM-A. The receiving circuit 225 receives a signal from the signal circuit 224 of the battery pack. The receiving circuit 25 controls the controlling circuit 222 corresponding to the signal received from the signal circuit 224. When the receiving circuit 225 receives from the signal circuit 224 a signal that represents that the secondary battery has stopped charging, the receiving circuit 225 causes for example a displaying means to inform the user of such a situation. The input terminal IN-BS is connected to an output terminal OUT-B.

The output terminal OUT-A of the charging portion and an input terminal IN-AP of the battery pack are connected. The output terminal OUT-B of the charging portion and an input terminal IN-BP of the battery pack are connected. The terminal TM-A of the charging portion and a terminal TM-C of the battery pack are connected. The terminal TM-B of the charging portion and a terminal TM-D of the battery pack are connected. The detecting circuit 223 is disposed between the terminal TM-D and the input terminal IN-BP. The terminal TM-C is connected to the signal circuit 224. The signal circuit 224 supplies to the charging portion a signal that represents the current state of the battery pack (for example, the temperature of the battery pack exceeds the chargeable temperature range and thereby the battery pack has stopped charging the secondary battery). The input terminal IN-AP is connected to an output terminal OUT-AP. The input terminal IN-BP is connected to an output terminal OUT-BP. The output terminals OUT-AP and OUT-BP are connected to the secondary battery.

Thus, in the conventional charging system, since many signal lines and signal terminals are required to supply a signal, the size of the battery pack becomes large and thereby the cost thereof rises.

OBJECTS AND SUMMARY OF THE INVENTION

An object of the present invention is to provide a charging apparatus, a secondary battery apparatus, a charging system, and a charging method that allow a signal to be exchanged between the charging apparatus and a battery pack without need to increase the number of signal lines.

A first aspect of the present invention is a charging apparatus, comprising a circuit portion for outputting a constant charging voltage or a constant charging current, a first terminal for outputting the charging voltage or charging current, a second terminal for inputting a control voltage and a control signal corresponding thereto, the control voltage being supplied to the circuit portion, and a third terminal for supplying a common voltage.

A second aspect of the present invention is a secondary battery apparatus, comprising a first terminal for inputting a charging voltage or charging current, a second terminal for inputting a control voltage and a control signal corresponding thereto, the control voltage being generated with the charging voltage and a reference voltage, a third terminal for supplying a common voltage, a secondary battery for inputting the charging voltage or charging current, a switching means, connected to the third terminal, for stopping supply of the charging voltage or charging current, and a temperature detecting means for detecting a chargeable temperature range, wherein when the temperature detecting means detects a temperature exceeding the chargeable temperature range corresponding to the control voltage, a control signal is generated.

A third aspect of the present invention is a charging system having a charging apparatus and a secondary battery apparatus connected thereto, the charging apparatus and the secondary battery apparatus being connected with a first signal line, a second signal line, and a third signal line. The charging apparatus has a circuit portion for outputting a constant charging voltage or a constant charging current. The secondary battery apparatus has a secondary battery for supplying the charging voltage or charging current through the first signal line, a voltage detecting means for detecting the charging voltage and supplying a control voltage and a control signal corresponding thereto to the circuit portion through the second signal line, the control voltage being generated corresponding to the charging voltage and a reference voltage, a switching means for stopping supply of the charging voltage or charging current connected to the third signal line for supplying a common voltage, and a temperature detecting means for detecting a chargeable temperature range, wherein when the temperature detecting means of the secondary battery apparatus detects a voltage exceeding the chargeable temperature range, the switching means stops supplying the charging voltage or charging current, changes the reference voltage, and generates a control signal corresponding to the control voltage. The charging apparatus detects the control signal corresponding to the control voltage, determines that the charging voltage or charging current stops, and controls the circuit portion corresponding to the control voltage.

A fourth aspect of the present invention is a charging method of a charging apparatus and a secondary battery apparatus connected thereto, the charging apparatus and the secondary battery apparatus being connected with a first signal line, a second signal line, and a third signal line, the method comprising the steps of causing the charging apparatus to output a constant charging voltage or a constant charging current, causing the secondary battery apparatus to supply the charging voltage or charging current through the first signal line, causing the secondary battery apparatus to detect the charging voltage and supply a control voltage and a control signal corresponding thereto to the circuit portion through the second signal line, the control voltage being generated corresponding to the charging voltage and a reference voltage, causing the secondary battery apparatus to stop supplying the charging voltage or charging current connected to the third signal line for supplying a common voltage, and causing the secondary battery apparatus to detect a chargeable temperature range. When the temperature of the secondary battery apparatus exceeds a voltage exceeding the chargeable temperature range, the secondary battery apparatus stops supplying the charging voltage or charging current, changes the reference voltage, and generates a control signal corresponding to the control voltage. The charging apparatus detects the control signal corresponding to the control voltage, determines that the charging voltage or charging current stops, and controls the circuit portion corresponding to the control voltage.

The charging apparatus and the battery pack are connected so as to communicate therebetween. At this point, the voltage and current detected in the battery pack are converted into a control voltage. The control voltage is supplied to the signal line between the protecting circuit of the secondary battery and the charging apparatus.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a schematic diagram for explaining control characteristics of a secondary battery;

FIG. 2 is a block diagram showing the structure of a conventional charging apparatus and a conventional battery pack;

DETAILED DESCRIPTION OF THE PREFERRED EMBODIMENTS

Figure 3:
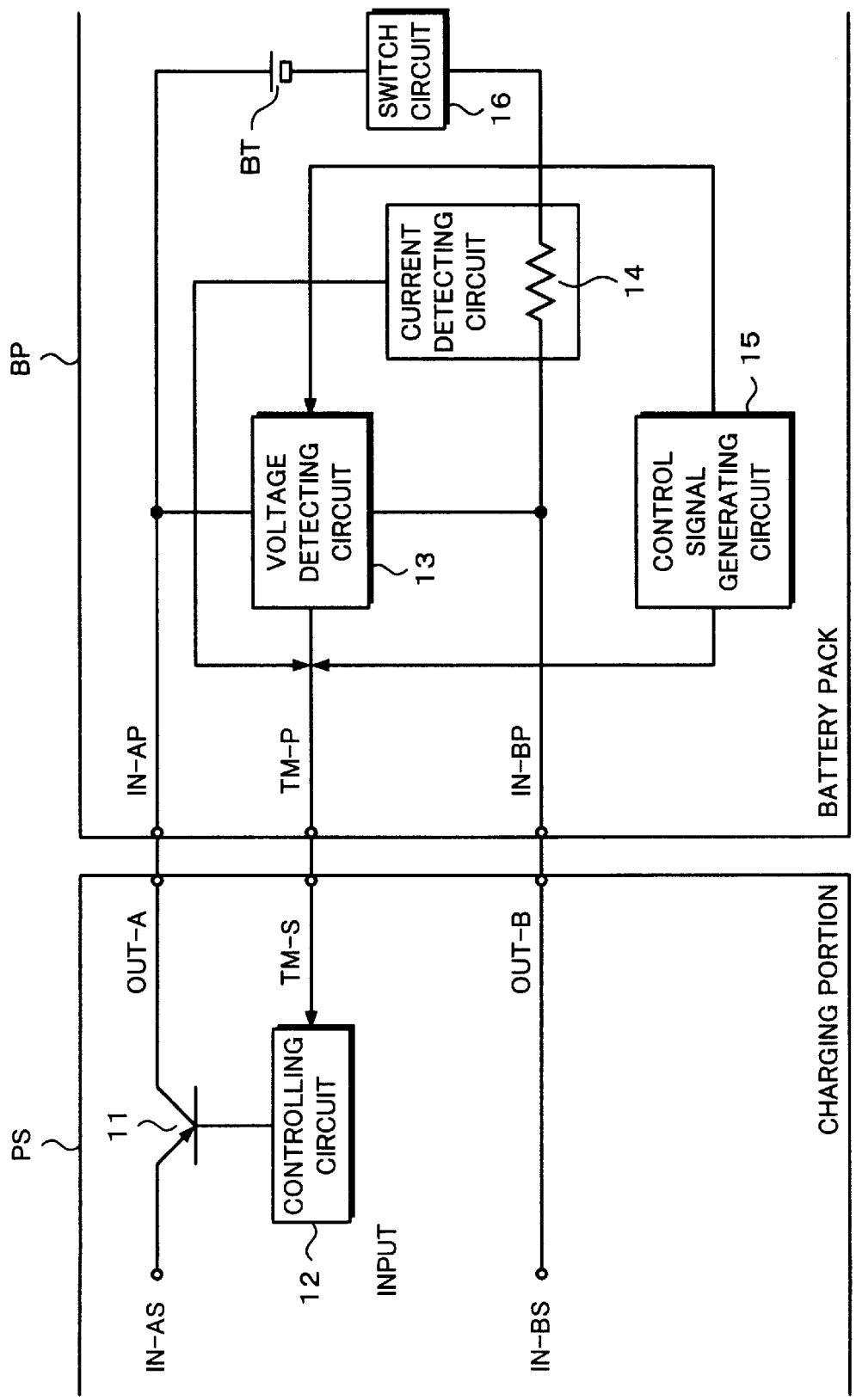
FIG. 3 is a block diagram showing an outlined structure of a charging system according to an embodiment of the present invention.

Next, with reference to the accompanying drawings, embodiments of the present invention will be described. FIG. 3 is a block diagram showing an outlined structure of a charging system according to an embodiment of the present invention. In FIG. 3, the charging system is composed of a charging portion PS and a battery pack BP. The charging portion PS is composed of a PNP type transistor 11 and a controlling circuit 12. A DC power is supplied from input terminals IN-AS and IN-BS. The input terminal IN-AS is connected to the emitter of the transistor 11. The collector of the transistor 11 is connected to an output terminal OUT-A. The base of the transistor 11 is connected to the controlling circuit 12. A control signal is supplied from the battery pack BP to the controlling circuit 12 through a terminal TM-S. Corresponding to the control signal, the transistor 11 is turned on/off. The input terminal IN-BS is connected to an output terminal OUT-B.

The output terminal OUT-A of the charging portion PS is connected to an input terminal IN-AP of the battery pack BP. The terminal TM-S of the charging portion PS is connected to a terminal TM-P of the battery pack BP. The output terminal OUT-B of the charging portion PS is connected to an input terminal IN-BP of the battery pack BP.

The battery pack BP is composed of a secondary battery BT, a voltage detecting circuit 13, a current detecting circuit (resistor) 14, a control signal generating circuit 15, and a switch circuit 16. The voltage detecting circuit 13 is disposed between the input terminal IN-AP and the input terminal IN-BP. The anode of the secondary battery BT is connected to the input terminal IN-AP. The switch circuit 16 and the resistor 14 are disposed in series between the cathode of the secondary battery BT and the input terminal IN-BP. The control signal generating circuit 15 generates a control signal corresponding to for example the temperature of the battery pack BP. The generated control signal is supplied to the charging portion PS through the terminal TM-P. In addition, the control signal is supplied to the voltage detecting circuit 13. The resistor 14 detects a current. The detected current is supplied to the charging portion PS through the terminal TM-P.

As with the switch circuit 16 shown in FIG. 3, the battery pack BP has a circuit that stops supplying the power in the case that the secondary battery BT charges out of the predetermined chargeable temperature range or discharges out of the predetermined dischargeable temperature range. In this example, the battery pack BP has the voltage detecting circuit 13 and the resistor 14. The voltage detecting circuit 13 controls the charging portion PS. The resistor 14 detects a current. This is because the voltage/current of the charging portion PS is controlled in the same manner as the voltage/current of the protecting circuit. In other words, the voltage detected by the voltage detecting circuit 13 and the current detected by the resistor 14 are supplied from the battery pack BP to the charging portion PS through the terminal TM-P. Likewise, the control signal generated by the control signal generating portion 15 is supplied from the battery pack BP to the charging portion PS through the terminal TM-P. Thus, a signal is supplied from the battery pack BP to the charging portion PS. Alternatively, a signal may be supplied from the charging portion PS to the battery pack BP.

Figure 4A:
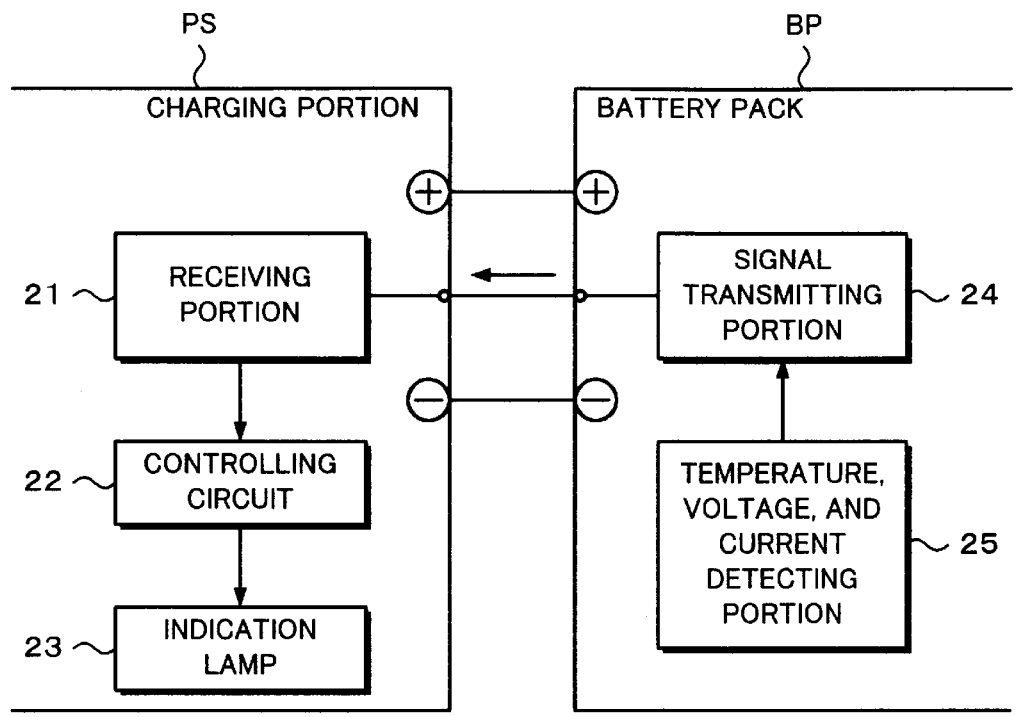
FIGS. 4A and 4B are schematic diagrams showing a signal transmission according to the present invention.

Next, with reference to FIGS. 4A and 4B, an example of a signal transmission according to the present invention will be described. In FIG. 4A, a charging portion PS and a battery pack BP are connected with respective +terminals, −terminals, and signal terminals. A temperature, voltage, and current detecting portion 25 of the battery pack BP detects a temperature, a voltage, and a current. The detected temperature, voltage, and current are supplied to a signal transmitting portion 24. The signal transmitting portion 24 supplies a signal corresponding to the signal received from the temperature, voltage, and current detecting portion 25 to the charging portion PS. In the charging portion PS, the received signal is supplied to a receiving portion 21. The received signal is supplied to a controlling circuit 22. Each portion of the charging portion PS is controlled corresponding to the signal received from the controlling circuit 22. When the charging portion PS stops charging the secondary battery corresponding to the signal received from the controlling circuit 22, an indication lamp 23 of the charging portion PS lights.

Figure 4B:
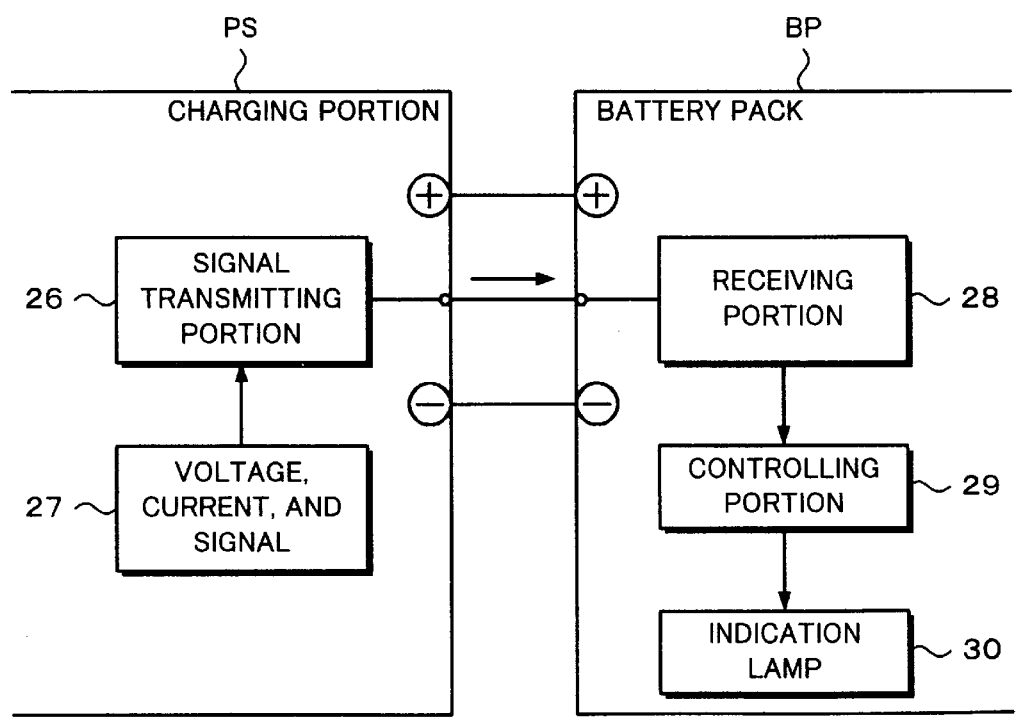

As with the structure shown in FIG. 4A, in FIG. 4B, a charging portion PS and a battery pack BP are connected with respective +terminals, −terminals, and signal terminals. A voltage, current, and signal 27 of the charging portion PS are supplied to a signal transmitting portion 26. The signal transmitting portion 26 supplies a signal corresponding to the voltage, current, and signal 27 to the battery pack BP.

In the battery pack BP, the received signal is supplied to a receiving portion 28. The received signal is supplied to a controlling circuit 29. Each portion of the battery pack BP is controlled corresponding to the signal received from the controlling circuit 29. When the battery pack BP stops charging a secondary battery corresponding to the signal received from the controlling circuit 29, an indication lamp 30 of the battery pack BP lights.

Figure 5:
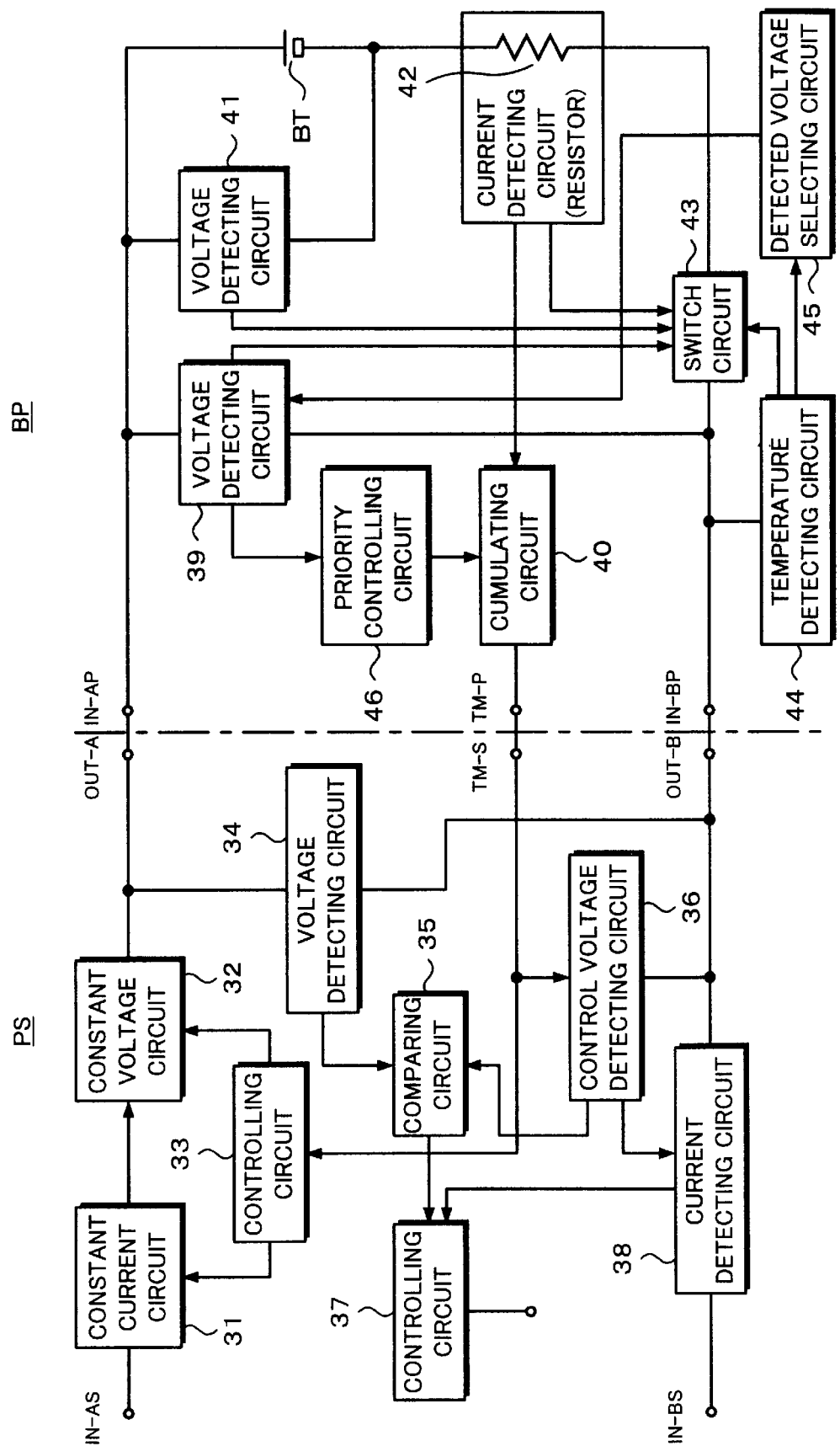
FIG. 5 is a block diagram showing the structure of a charging system according to a first embodiment of the present invention.

FIG. 5 is a block diagram showing a detailed structure of a charging system according to the present invention. A DC power is supplied from input terminals IN-AS and IN-BS of a charging portion PS. A constant current circuit 31 and a constant voltage circuit 32 are disposed in series between the input terminal IN-AS and an output terminal OUT-A. A current detecting circuit 38 is disposed between the input terminal IN-BS and an output terminal OUT-B. A voltage detecting circuit 34 is disposed between the output terminals OUT-A and OUT-B. A control voltage detecting circuit 36 is disposed between a terminal TM-S and the output terminal OUT-B. The terminal TM-S is connected to a controlling circuit 33. The controlling circuit 33 controls the constant current circuit 31 and the constant voltage circuit 32 corresponding to a control signal received from the terminal TM-S.

A charging voltage detected by the voltage detecting circuit 34 and a control voltage detected by the control voltage detecting circuit 36 are supplied to a comparing circuit 35 and the current detecting circuit 38, respectively. The comparing circuit 35 compares the charging voltage and the control voltage and supplies the compared result to a controlling circuit 37. The current detecting circuit 38 detects a predetermined current corresponding to the received control voltage and supplies the detected current to the controlling circuit 37. The controlling circuit 37 controls the charging portion PS corresponding to the compared result received from the comparing circuit 35 and the current received from the current detecting circuit 38. When the controlling circuit 37 stops charging a secondary battery, the controlling circuit 37 causes an indication lamp, an LCD display, or a speaker to indicate an alarm.

The output terminal OUT-A of the charging portion PS is connected to an input terminal IN-AP of the battery pack BP. The output terminal OUT-B of the charging portion PS is connected to an input terminal IN-BP of the battery pack BP. The terminal TM-S of the charging portion PS is connected to a terminal TM-P of the battery pack BP.

A voltage detecting circuit 39 is disposed between the input terminal IN-AP and the input terminal IN-BP. The voltage detecting circuit 39 detects an over-charging voltage. The charging voltage detected by the voltage detecting circuit 39 is supplied to a priority controlling circuit 46 and a switch circuit 43. The priority controlling circuit 46 assigns a priority to the charging voltage and supplies the resultant voltage to a cumulating circuit 40. A voltage detecting circuit 41 is disposed between the anode and the cathode of a secondary battery BT. The voltage detecting circuit 41 detects a terminal voltage of the secondary voltage BT. The voltage detecting circuit 41 detects an overcharging voltage. The detected voltage is supplied to the switch circuit 43. The anode of the secondary battery BT is connected to the input terminal IN-AP. A resistor 42 and the switch circuit 43 are disposed in series between the cathode of the secondary battery BT and the input terminal IN-BP. A current detected by the resistor 42 is supplied to the cumulating circuit 40 and the switch circuit 43.

The cumulating circuit 40 adds the charging voltage received from the voltage detecting circuit 39 through the priority controlling circuit 46 and the current detected by the resistor 42 and supplies the added result as a control signal to the charging portion PS through the terminal TM-P. The input terminal IN-BP is connected to a temperature detecting circuit 44. The temperature detecting circuit 44 detects the temperature of the battery pack BP. The detected result is supplied to the switch circuit 43 and a detected voltage selecting circuit 45. The switch circuit 43 is turned on/off corresponding to the charging voltage received from the voltage detecting circuit 39, the terminal voltage received from the voltage detecting circuit 41, the current detected by the resistor 42, and the detected result of the temperature detecting circuit 44. For example, when the temperature of the battery pack BP exceeds the predetermined chargeable temperature range, the switch circuit 43 is turned off. The detected voltage selecting circuit 45 selects a reference voltage (namely, a constant voltage to be generated) corresponding to the detected result.

Figure 6:
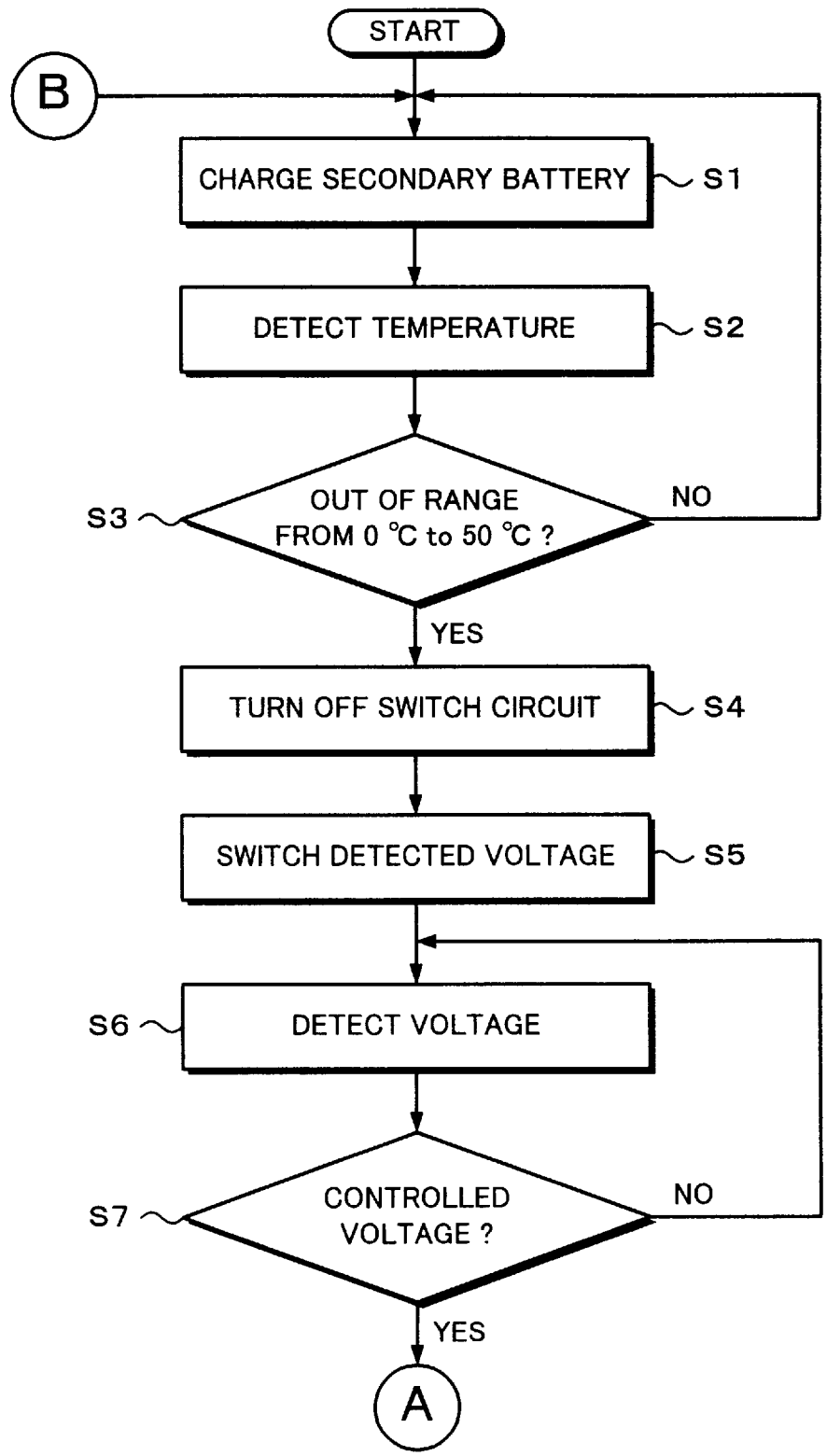
FIG. 6 is a first part of a flow chart showing an operation algorithm of the charging system according to the first embodiment of the present invention.
Figure 7:
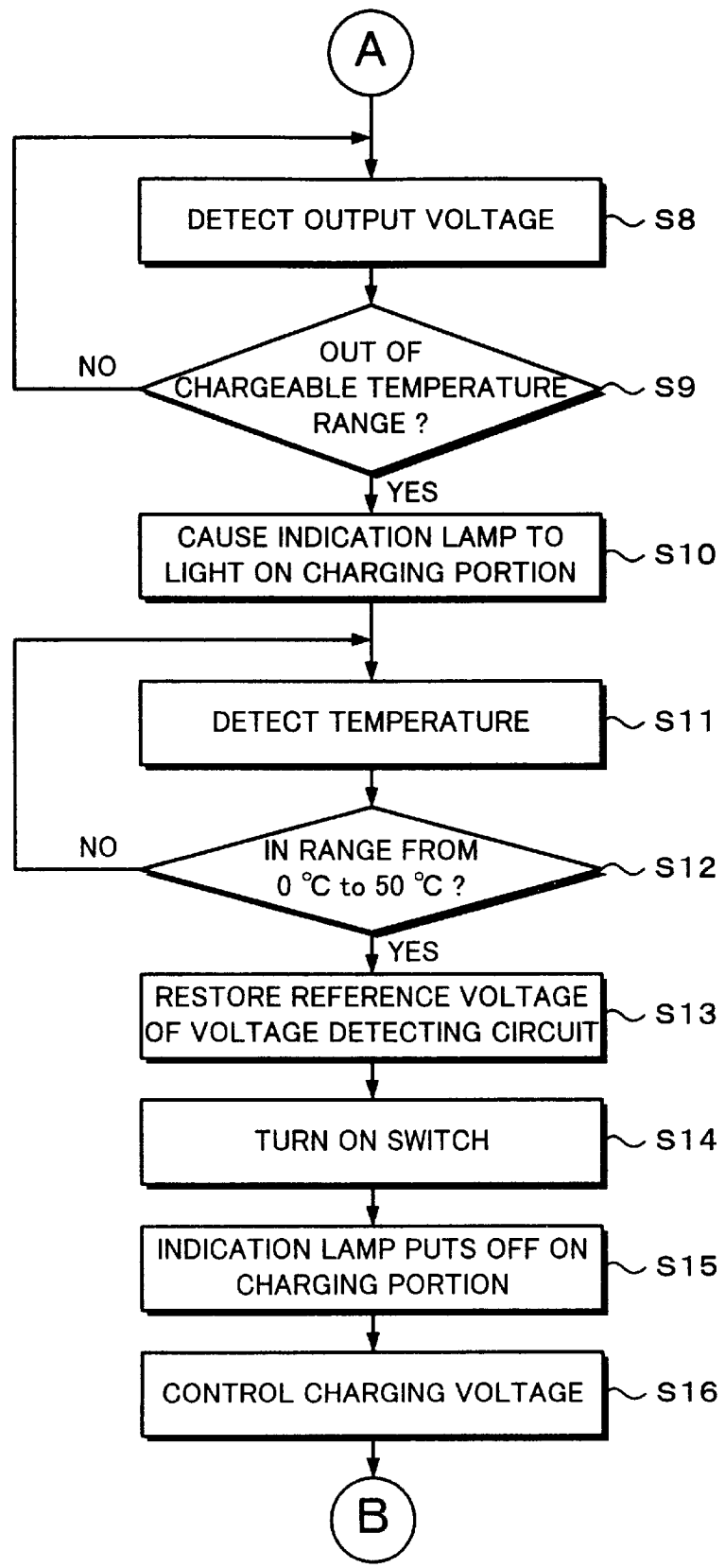
FIG. 7 is a second part of the flow chart shown in FIG. 6.

Next, with reference to a flow chart shown in FIGS. 6 and 7, an operation algorithm of the charging system according to the first embodiment of the present invention will be described. At step S1, the charging portion PS and the battery pack BP are connected so as to charge the secondary battery BT. At step S2, the temperature detecting circuit 44 detects the temperature of the battery pack BP. At step S3, it is determined whether or not the detected temperature is out of the range for example from 0° C. to 50° C. When the determined result at step S3 is Yes, the flow advances to step S4. When the determined result at step S3 is No, the flow returns to step S1. At step S1, the charging portion PS charges the secondary battery BT. At step S4, the switch circuit 43 is turned off. At step S5, the detected voltage selecting circuit 45 switches the reference voltage of the voltage detecting circuit 39 from for example 4.2 V to 3.0 V. At step S6, the charging voltage supplied from the charging portion PS is detected. At step S7, it is determined whether or not the charging voltage has been controlled. When the determined result at step S7 is Yes, the flow advances to step SB. When the determined result at step S8 is No, the flow returns to step S6.

At step S8, the voltage detecting circuit 34 detects the output voltage of the charging portion PS. At step S9, it is determined whether or not the temperature detected by the temperature detecting circuit 44 is out of the chargeable temperature range. When the determined result at step S9 is No, the flow returns to step SB. When the determined result at step S8 is Yes, the flow advances to step S10. At step S10, the indication lamp that informs the user that the battery pack BP cannot be used lights. At step Sl, the temperature detecting circuit 44 detects the temperature of the battery pack BP. At step S12, it is determined whether or not the detected temperature is in the range from 0° C. to 50° C. When the determined result at step S12 is Yes, the flow advances to step S13. When the determined result at step S12 is No, the flow returns to step S11

At step S13, the reference voltage of the voltage detecting circuit 39 is switched from 3.0 V to 4.2 V. At step S14, the switch circuit 43 is turned on. Thus, the charging portion PS starts charging the secondary battery BT. At step S15, the indication lamp that informs the user that the battery pack BP cannot be used turns off. At step S16, the constant current voltage 31 and the constant voltage circuit 32 are controlled. Thereafter, the flow returns to step S.

Figure 8:
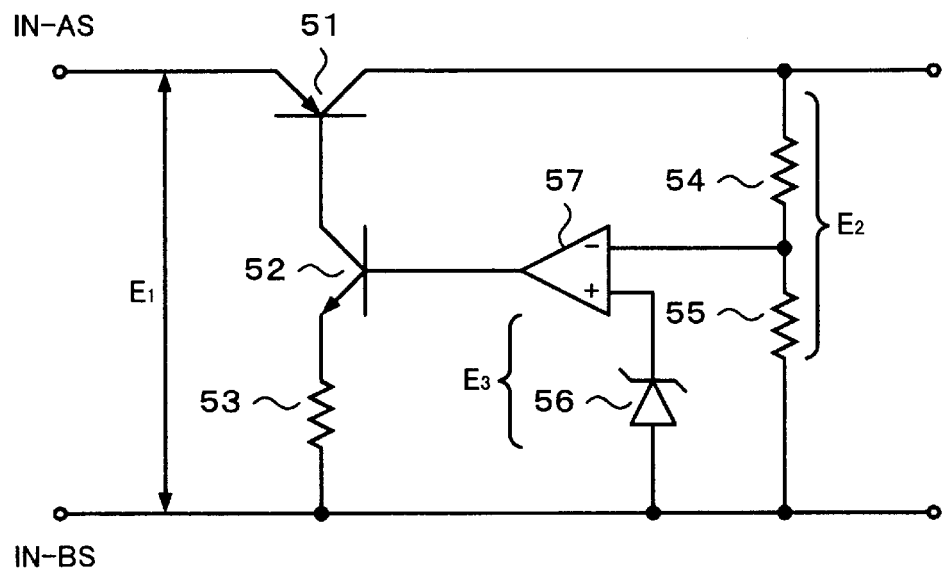
FIG. 8 is a circuit diagram for explaining a regulator according to the present invention.

Next, with reference to FIG. 8, an operation of a regulator according to the present invention will be described. The emitter of a PNP transistor 51 is connected to an input terminal IN-AS. The collector of the transistor 51 is connected to a first output terminal. The base of the transistor 51 is connected to the collector of an NPN transistor 52. A resistor 53 is disposed between the emitter of the transistor 52 and an input terminal IN-BS. The input terminal IN-BS is connected to a second output terminal. Resistors 54 and 55 are disposed in series between the first and second output terminals. A first input terminal of a comparator 57 is connected to the connected point of the resistors 54 and 55. The second input terminal of the comparator 57 is connected to the cathode of a Zener diode 56. An output terminal of the comparator 57 is connected to the base of the transistor 52. The anode of the Zener diode 56 is connected to the second output terminal.

An input voltage E1 is supplied from the input terminals IN-AS and IN-BS. An output voltage (charging voltage) E2 is output from the first and second output terminals to a secondary battery BT (not shown). A voltage difference E3 between the base of the transistor 52 and the input terminal IN-BS varies corresponding to the relation between the input voltage E1 and the output voltage E2. The voltage difference E3 satisfies the following conditions.

In the case of input voltage E1$\leq$output voltage E2, the voltage difference E3 is maximum.

In the case of input voltage E1>output voltage E2, the voltage difference E3 is minimum. In other words, in the case of E1$\leq$E2, the charging system operates as a switch. In the case of E1>E2, the charging system operates as a regulator. Thus, when the operation of the regulator is varied and the voltage difference E3 is detected, the operation of the regulator can be detected. Consequently, the voltage E2 can be used as a voltage of a transmission signal.

Figure 9:
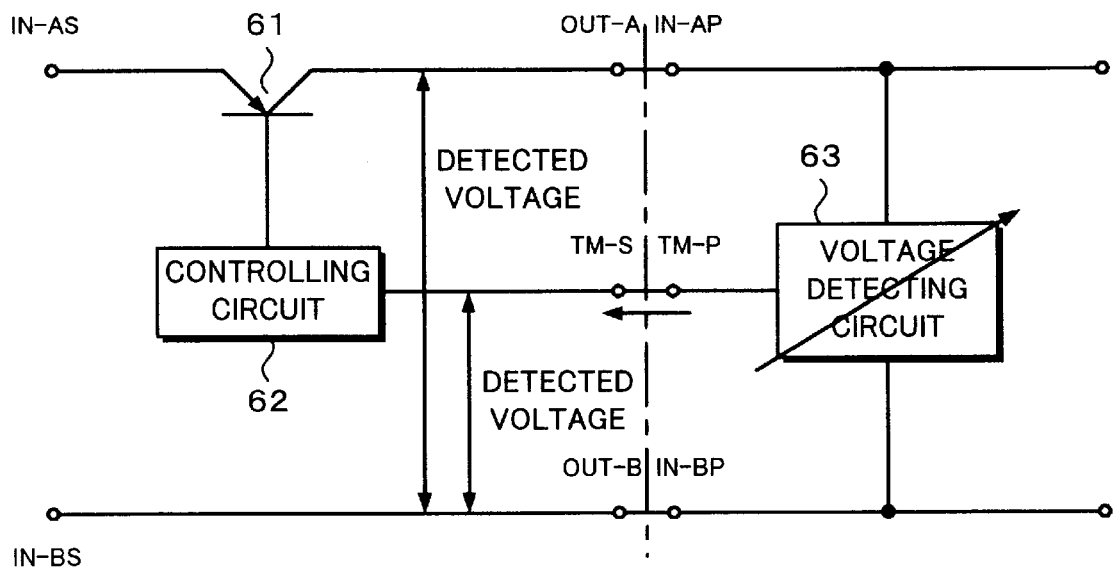
FIG. 9 is a block diagram showing an outlined structure of the regulator.

FIG. 9 is a circuit diagram showing an outlined structure of the regulator. The emitter of a PNP transistor 61 is connected to an input terminal IN-AS. The collector of the transistor 61 is connected to an output terminal OUT-A. The base of the transistor 61 is connected to a controlling circuit 62. An input terminal IN-BS is connected to an output terminal OUT-B and an input terminal IN-BP. The output terminal OUT-A is connected to an input terminal IN-AP. A terminal TM-S is connected to a terminal TM-P. A voltage detecting circuit 63 is disposed between the input terminal IN-AP and the input terminal IN-BP. The voltage detecting circuit 63 supplies a detected charging voltage to a controlling circuit 62 through the terminals TM-P and TM-S. When a reference voltage of the voltage detecting circuit 63 is varied, the operation of the charging portion PS as the regulator can be varied. By varying the reference voltage, a signal can be transmitted. The voltage between the output terminals OUT-A and OUT-B is in the range from for example 2.5 V to 3 V. For example, a control signal is detected between the terminal TM-S and the output terminal OUT-B. Thus, corresponding to the voltage detected from the battery pack BP, the operation of the charging portion PS as the regulator can be varied.

Figure 10:
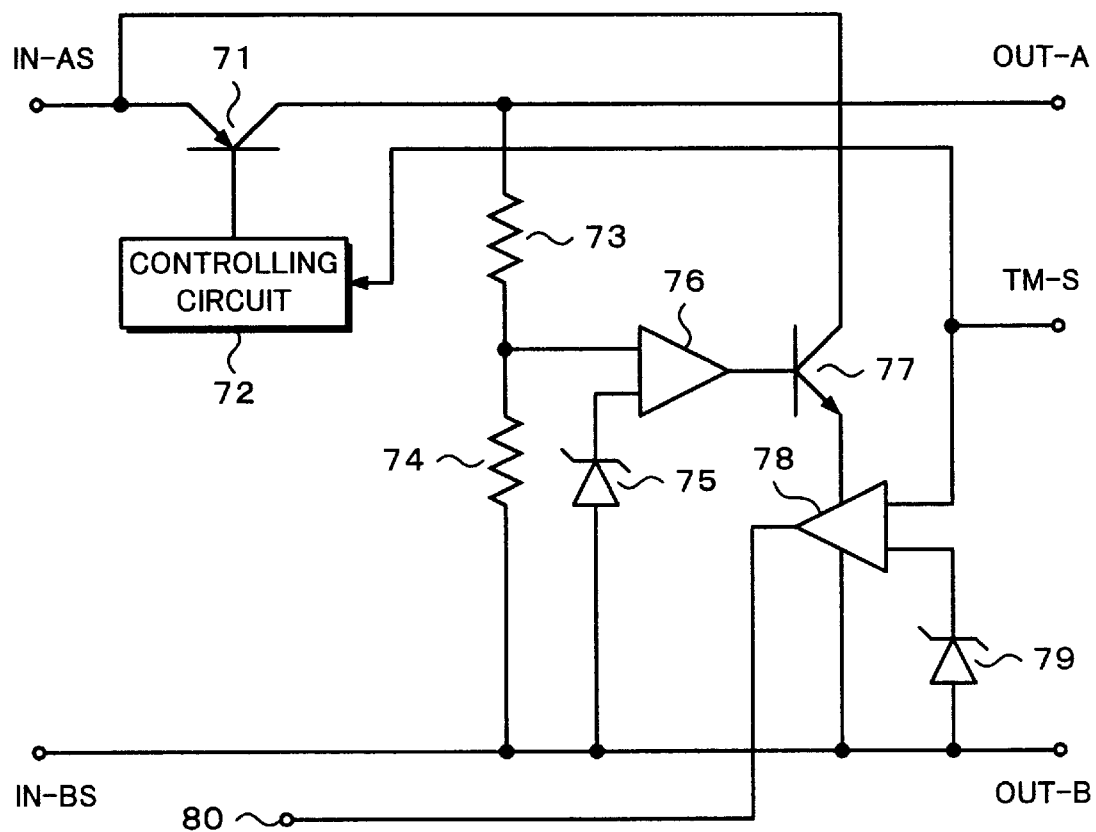
FIG. 10 is a circuit diagram showing a first example of the structure of the regulator.

FIG. 10 is a circuit diagram showing a first example of the structure of the regulator. In FIG. 10, an input terminal IN-AS is connected to the emitter of a PNP transistor 71 and the collector of an NPN type transistor 77. The collector of the transistor 71 is connected to an output terminal OUT-A. The base of the transistor 71 is connected to a controlling circuit 72. An input terminal IN-BS is connected to an output terminal OUT-B. Resistors 73 and 74 are disposed in series between the output terminals OUT-A and OUT-B. A first input terminal of a comparator 76 is connected to the connected point of the resistors 73 and 74. A second input terminal of the comparator 76 is connected to the cathode of a Zener diode 75. The anode of the Zener diode 75 is connected to the output terminal OUT-B. An output terminal of the comparator 76 is connected to the base of the transistor 77. The emitter of the transistor 77 is connected to a power terminal of a comparator 78. A ground terminal of the comparator 78 is connected to the output terminal OUT-B. A first input terminal of the comparator 78 is connected to the controlling circuit 72 and a terminal TM-S. A second input terminal of the comparator 78 is connected to the cathode of a Zener diode 79. An output terminal of the comparator 78 is connected to a terminal 80. Thus, an output signal of the comparator 78 is output through the terminal 80. The anode of the Zener diode 79 is connected to the output terminal OUT-B.

Figure 11:
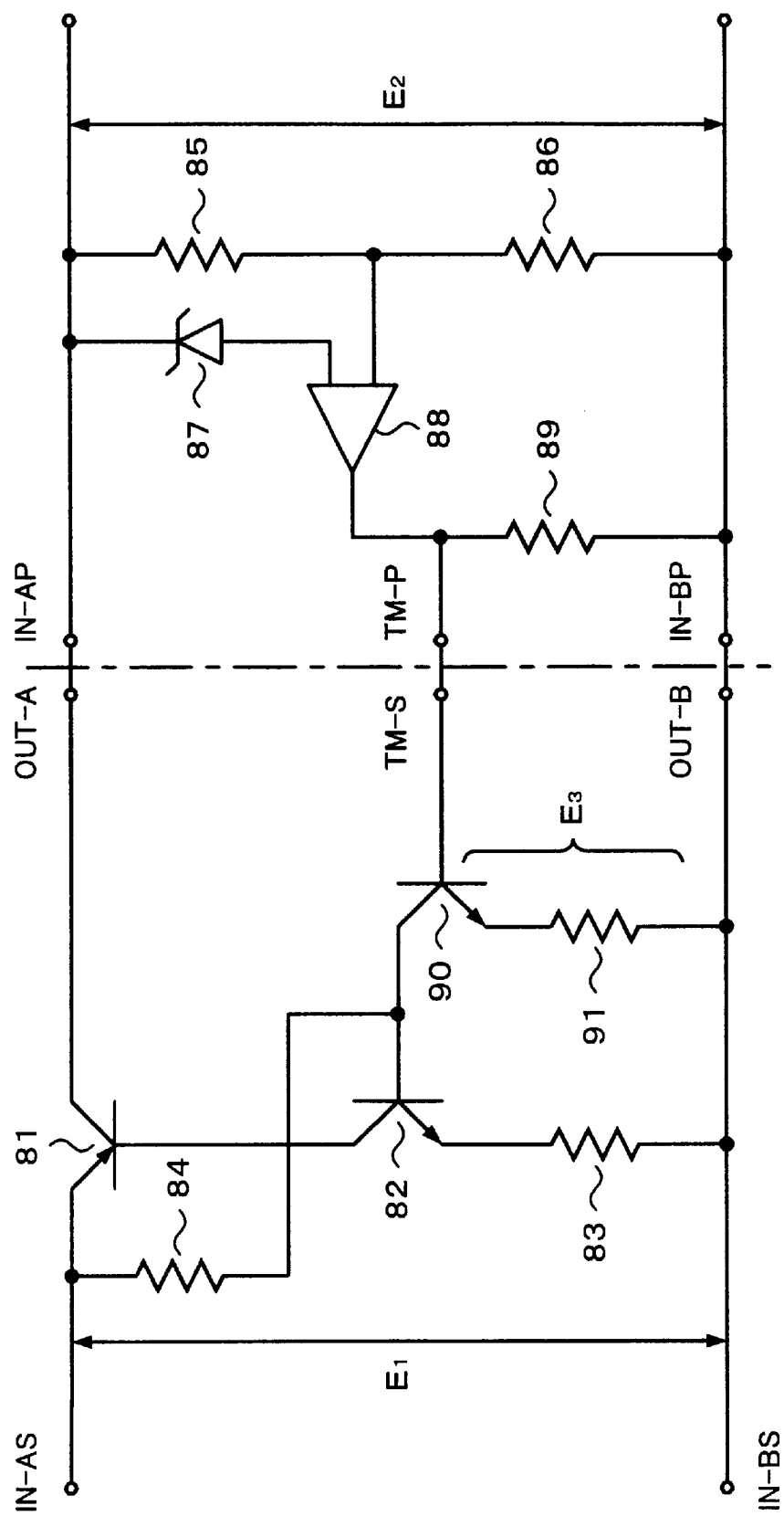
FIG. 11 is a circuit diagram showing a second example of the structure of the regulator.

FIG. 11 is a circuit diagram showing a second example of the structure of the regulator in the case that the relation of the input voltage E1, the output voltage E2, and the voltage difference E3 is different from that of the first example shown in FIG. 10. In FIG. 11, the emitter of a PNP transistor 81 of a charging portion PS is connected to an input terminal IN-AS. The collector of the transistor 81 is connected to an output terminal OUT-A. The base of the transistor 81 is connected the collector of an NPN transistor 82. A resistor 83 is disposed between the emitter of the transistor 82 and an input terminal IN-BS. A resistor 84 is disposed between the base of the transistor 82 and the input terminal IN-AS. The base of an NPN transistor 90 is connected to a terminal TM-S. The collector of the transistor 90 is connected to the base of the transistor 82. The emitter of the transistor 90 is connected to an output terminal OUT-B through a resistor 91. The input terminal IN-BS is connected to the output terminal OUT-B.

The output terminal OUT-A of the charging portion PS is connected to an input terminal IN-AP of a battery pack BP. The output terminal OUT-B of the charging portion PS is connected to an input terminal IN-BP of the battery pack BP. The terminal TM-S of the charging portion PS is connected to a terminal TM-P of the battery pack BP.

Resistors 85 and 86 are disposed in series between the input terminals IN-AP and IN-BP. The input terminals IN-AP and IN-BP are connected to respective output terminals. The connected point of the resistors 85 and 86 is connected to a first input terminal of a comparator 88. The cathode of a Zener diode 87 is connected to the input terminal IN-AP. The anode of the Zener diode 87 is connected to a second input terminal of the comparator 88. A resistor 89 is disposed between the output terminal of the comparator 88 and the input terminal IN-BP. The output terminal of the comparator 88 is also connected to the terminal TM-P.

In the circuit shown in FIG. 11, an input voltage E1 is supplied from the input terminals IN-AS and IN-BS. An output voltage (charging voltage) E2 is supplied to a secondary battery BT (not shown) through the output terminals. The voltage difference E3 between the base of the transistor 90 and the output terminal OUT-B varies corresponding to the relation between the input voltage E1 and the output voltage E2. The voltage difference E3 satisfies the following conditions.

In the case of input voltage E1≦output voltage E2, the voltage difference E3 is almost 0 V.

In the case of input voltage E1>output voltage E2, the voltage difference E3 is high. In other words, in the case of E1≦E2, the charging portion operates as a switch. Thus, the voltage E3 becomes almost 0 V. In the case of E1>E2, the charging portion PS operates as a regulator. Thus, the voltage E3 becomes high. Consequently, it can be determined whether or not the charging portion PS operates as a regulator with the voltage E3. Thus, the voltage E2 can be used as a transmission signal voltage.

Figure 12:
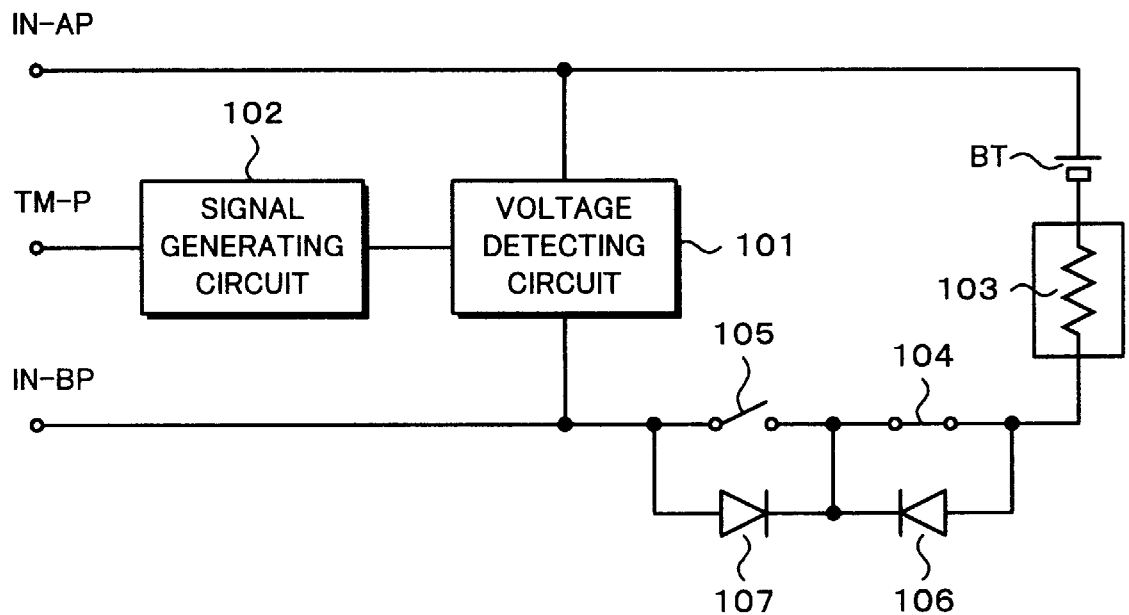
FIG. 12 is a block diagram showing an outlined structure of a battery pack according to an embodiment of the present invention.

FIG. 12 is a block diagram showing an outlined structure of a battery pack BP according to the present invention. In FIG. 12, a voltage detecting circuit 101 is disposed between input terminals IN-AP and IN-BP. The voltage detecting circuit 101 supplies an input voltage to a signal generating circuit 102. The signal generating circuit 102 generates a signal corresponding to the input voltage. The generated signal is supplied to a charging portion PS through a terminal TM-P. The anode of a secondary battery BT is connected to the input terminal IN-AP. The cathode of the secondary battery is connected to a first terminal of a switch 104 through a resistor 103. A second terminal of the switch 104 is connected to a first terminal of a switch 105. A second terminal of the switch 105 is connected to the input terminal IN-BP. The cathode of a diode 106 is connected to the second terminal of the switch 104. The anode of the diode 106 is connected to the first terminal of the switch 104. The cathode of a diode 107 is connected to the first terminal of the switch 105. The anode of the diode 107 is connected to the second terminal of the switch 105.

In FIG. 12, when the switch 104 and/or the switch 105 are(is) turned off, the reference voltage of the voltage detecting circuit 101 is varied. A signal corresponding to the reference voltage is used.

Figure 13:
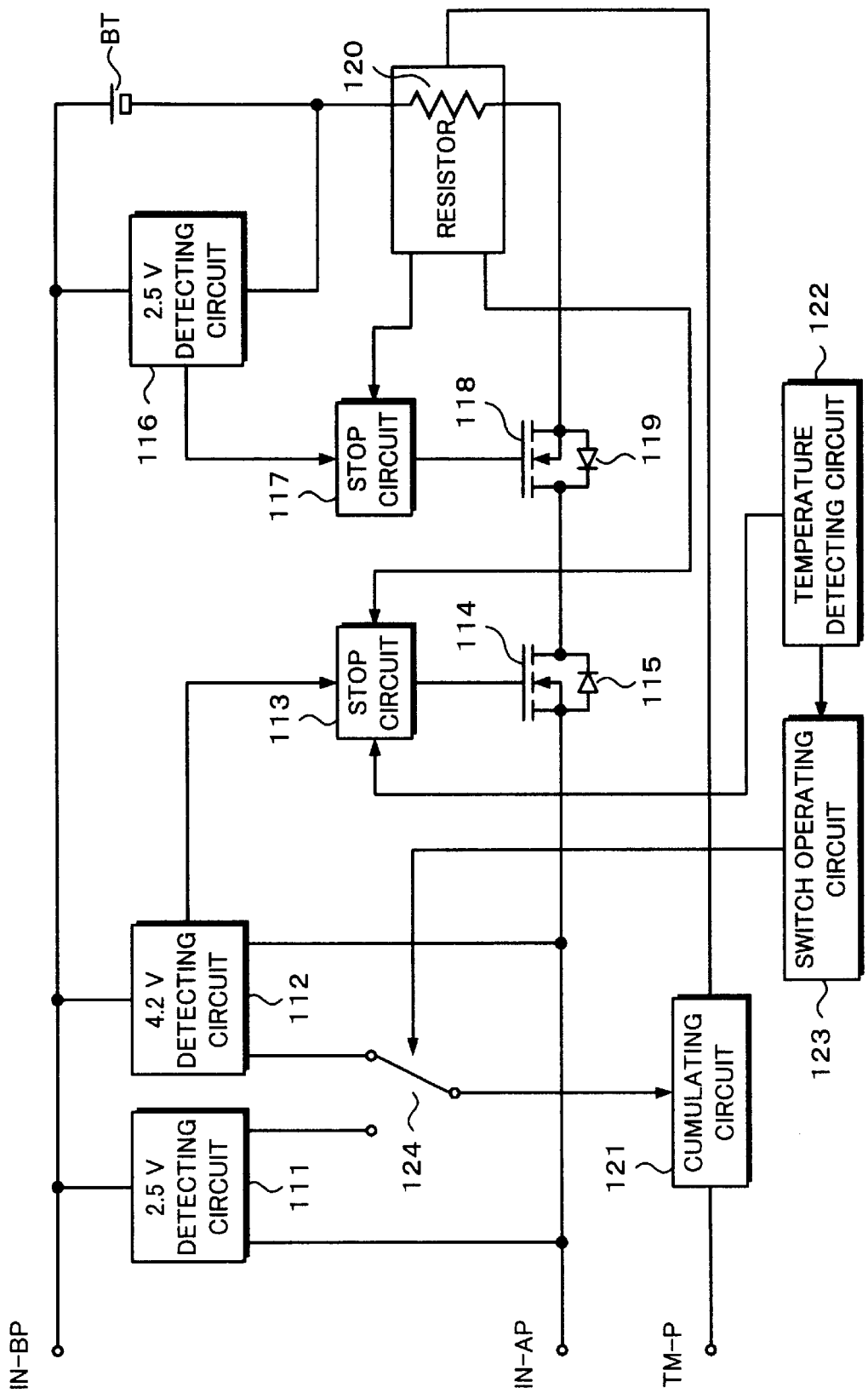
FIG. 13 is a block diagram showing the structure of a battery pack according to the first embodiment of the present invention.

FIG. 13 is a block diagram showing the structure of a battery pack BP according to a first embodiment of the present invention. A 2.5 V detecting circuit 111 and a 4.2 V detecting circuit 112 are disposed in parallel between input terminals IN-AP and IN-BP. One of detected voltages of the 2.5 V detecting circuit 111 and the 4.2 V detecting circuit 112 is selected by a switch 124. The selected voltage is supplied to a cumulating circuit 121. In addition, the voltage detected by the 4.2 V detecting circuit 112 is supplied to a stop circuit 113. The anode of a secondary battery BT is connected to the input terminal IN-AP. The cathode of the secondary battery BT is connected to the input terminal IN-BP through a resistor 120 and N channel enhanced FETs (field effect transistors) 118 and 114.

The gate of the FET 114 is connected to the stop circuit 113. The gate of the FET 118 is connected to a stop circuit 117. The stop circuits 113 and 117 control on/off operations of the battery pack BP. The connecting direction between the source and drain of the FET 114 is opposite to the connecting direction between the source and drain of the FET 118. In other words, the FET 114 controls a current that flows from the secondary battery BT to the input terminal IN-BP with a signal supplied from the stop circuit 113 to the gate of the FET 114. On the other hand, the FET 118 controls a current that flows from the input terminal IN-BP to the secondary battery BT with a signal supplied from the stop circuit 117 to the gate of the FET 118. Parasitic diodes 115 and 119 are connected to the FETs 114 and 118, respectively. In the parasitic diode 115, a current flow is in the opposite direction of the current restricted direction of the FET 114. In the parasitic diode 119, a current flow is in the opposite direction of the current restricted direction of the FET 118.

A 2.5 V detecting circuit 116 is disposed between the anode and cathode of the secondary battery BT. The 2.5 V detecting circuit 116 detects a terminal voltage of the secondary battery BT. A voltage detected by the 2.5 V detected circuit 116 is supplied to the stop circuit 117. The resistor 120 detects a current. The current detected by the resistor 120 is supplied to the stop circuits 113 and 117 and the cumulating circuit 121. A temperature detecting circuit 122 supplies a detected temperature to the stop circuit 113 and a switch operating circuit 123. The switch operating circuit 123 controls a switching operation of the switch 123 corresponding to the received temperature. The cumulating circuit 121 adds the voltage received from one of the 2.5 V detecting circuit 111 and the 4.2 V detecting circuit 112 and the current detected by the resistor 120 and supplies the added result as a control signal to the charging portion PS through a terminal TM-P.

Figure 14:
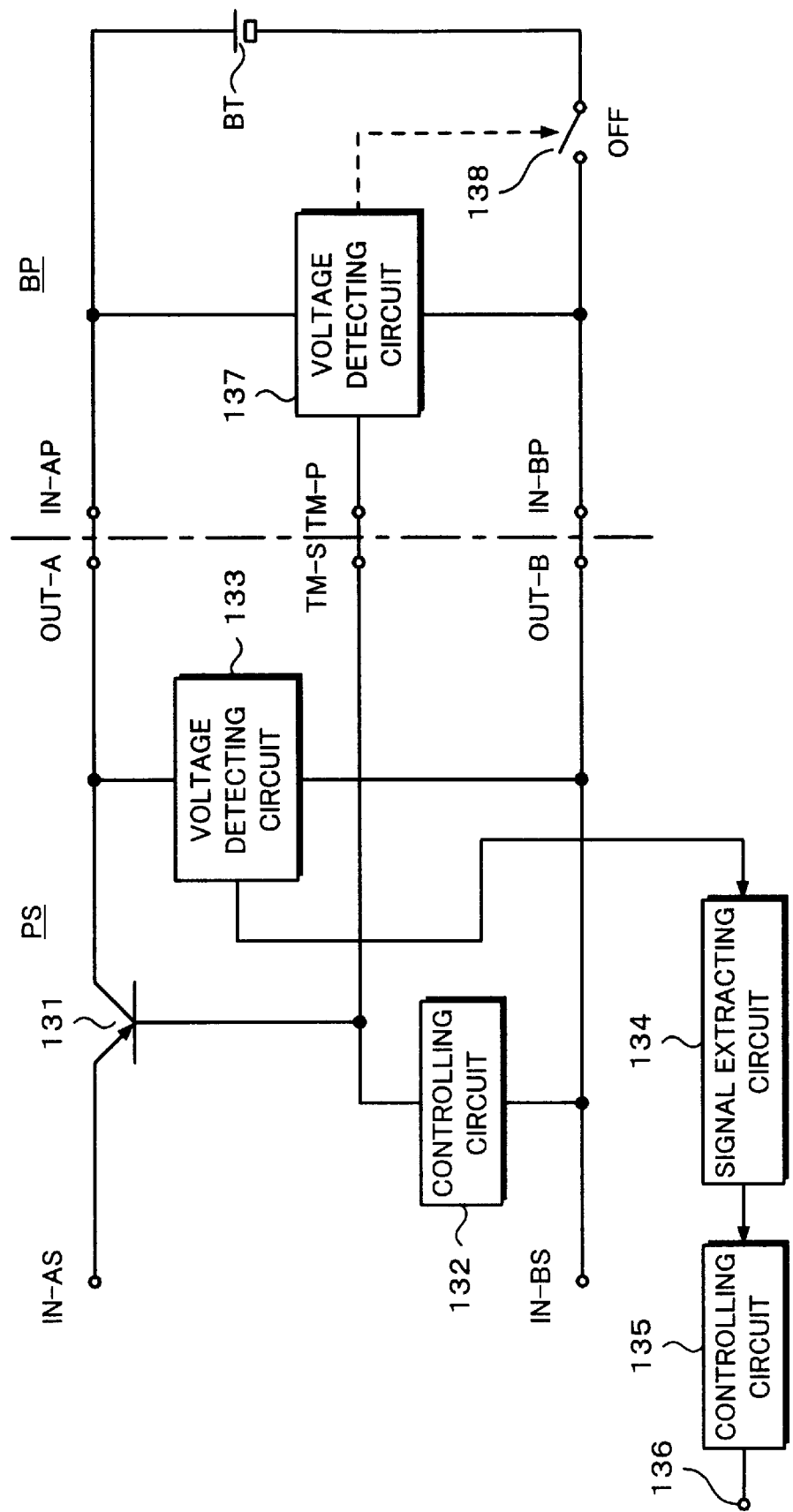
FIG. 14 is a block diagram showing the structure of a charging system according to a second embodiment of the present invention.

FIG. 14 is a block diagram showing the structure of a charging system according to a second embodiment of the present invention. In FIG. 14, the emitter of a PNP transistor 131 is connected to an input terminal IN-AS of a charging portion PS. The collector of the transistor 131 is connected to an input terminal IN-AP of a battery pack BP through an output terminal OUT-A. The base of the transistor 131 is connected to a terminal TM-S. A controlling circuit 132 is disposed between the base of the transistor 131 and an input terminal IN-BS. The input terminal IN-BS of the charging portion PS is connected to an input terminal IN-BP of the battery pack BP through an output terminal OUT-B. A voltage detecting circuit 133 is disposed between the output terminals OUT-A and OUT-B. A voltage detected by the voltage detecting circuit 133 is supplied to a signal extracting circuit 134.

The signal extracting circuit 134 extracts a signal from the received voltage and supplies the extracted signal to a controlling portion 135. The controlling circuit 135 outputs a control signal for controlling the charging portion PS corresponding to the received signal to a terminal 136. A voltage detecting circuit 137 is disposed between the input terminals IN-AP and IN-BP. The anode of a secondary battery BT is connected to the input terminal IN-AP. The cathode of the secondary battery BT is connected to the input terminal IN-BP through a switch 138. When the charging portion PS communicates with the battery pack BP, the charging portion PS stops charging the secondary battery BT of the battery pack BP and changes the reference voltage of the voltage detecting circuit 137. In the charging portion PS, a constant voltage circuit outputs a voltage corresponding to the selected reference voltage. The voltage detecting circuit 133 detects a signal and reads the supplied signal. The controlling circuit 132 determines whether or not a regulator operates.

Figure 15:
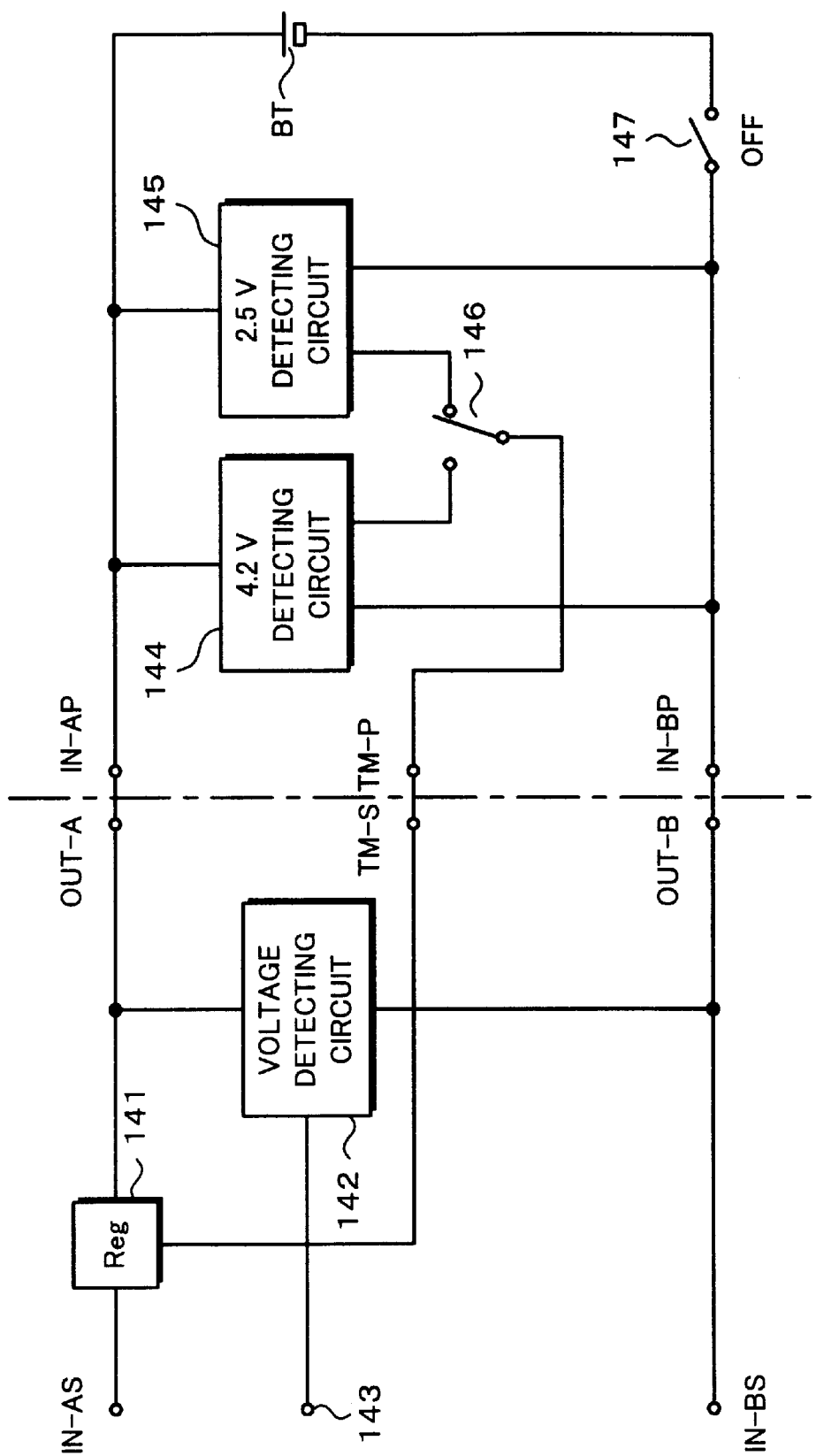
FIG. 15 is a block diagram showing the structure of a charging system according to a third embodiment of the present invention.

FIG. 15 is a block diagram showing the structure of a charging system according to a third embodiment of the present invention. A regulator 141 is disposed between an input terminal IN-AS and an output terminal OUT-A. A control signal is supplied to the regulator 141 through terminals TM-P and TM-S. An input terminal IN-BS is connected to an input terminal IN-BP through an output terminal OUT-B. A voltage detecting circuit 142 is disposed between the output terminals OUT-A and OUT-B. The voltage detecting circuit 142 outputs a detected voltage through a terminal 143.

Figures 16A, 16B:
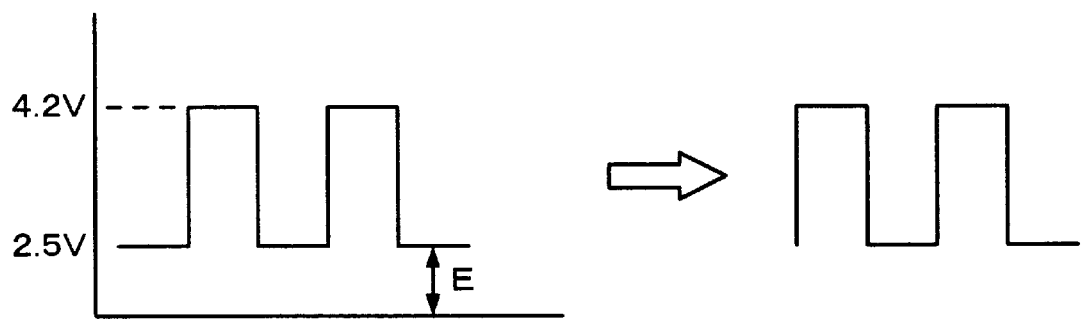
FIGS. 16A and 16B are schematic diagrams for explaining a signal transmission according to the present invention.

A 4.2 V detecting circuit 144 and a 2.5 V detecting circuit 145 are disposed in parallel between the input terminals IN-AP and IN-BP. The anode of a secondary battery BT is connected to the input terminal IN-AP. The cathode of the secondary battery BT is connected to the input terminal IN-BP through a switch 147. One of voltages detected by the 4.2 V detecting circuit 144 and the 2.5 V detecting circuit 145 is selected by a switch 146. The selected voltage is supplied to the terminal TM-P. By the switching operation of the switch 146, a pulse signal as shown in FIG. 16A is generated. A voltage E shown in FIG. 16A is the minimum voltage at which the charging system can operate. The pulse signal is supplied from the battery pack BP to the charging portion PS. The charging portion PS detects a waveform as shown in FIG. 16B.

Figure 17:
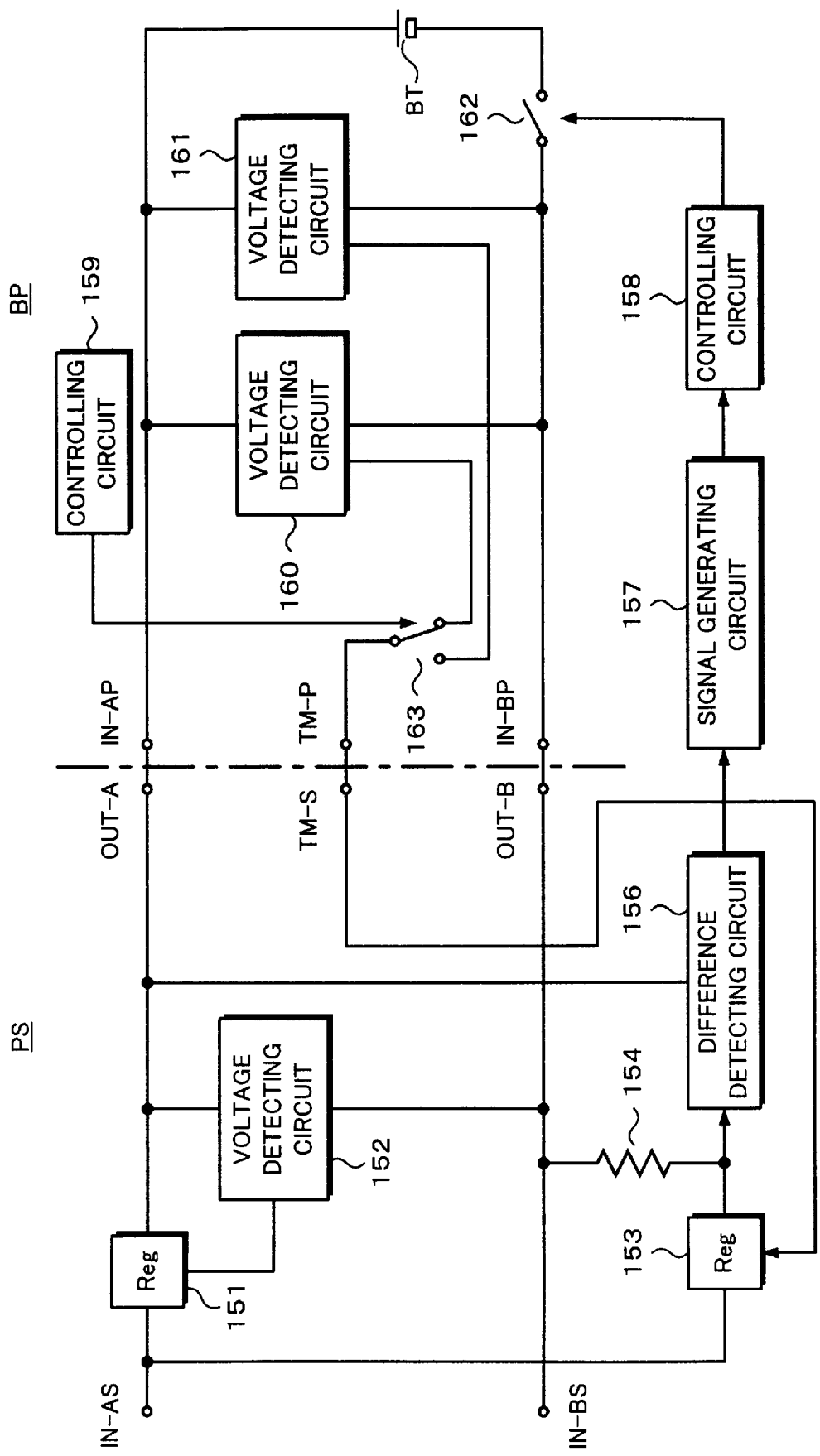
FIG. 17 is a block diagram showing the structure of a charging system according to a fourth embodiment of the present invention.

FIG. 17 is a block diagram showing the structure of a charging system according to a fourth embodiment of the present invention. In the structure shown in FIG. 17, the mode of the system is switched between constant voltage mode and constant current mode corresponding to a received signal. A regulator (Reg) 151 is disposed between an input terminal IN-AS of a charging portion PS and an output terminal OUT-A. An input terminal IN-BS of the charging portion PS is connected to an input terminal IN-BP of a battery pack BP through an output terminal OUT-B. A voltage detecting circuit 152 is disposed between the output terminals OUT-A and OUT-B. A first input terminal of a regulator 153 is connected to the input terminal IN-AS. A second input terminal of the regulator 153 is connected to a switch 163 through terminals TM-P and TM-S. An output terminal of the regulator 153 is connected to a difference detecting circuit 156. In addition, the output terminal of the regulator 153 is connected to the output terminal OUT-B through a resistor 154.

The difference detecting circuit 156 detects the difference between an output signal of the regulator 151 and an output signal of the regulator 153. The detected difference is supplied to a signal generating circuit 157. The signal generating circuit 157 generates a signal corresponding to the difference. The generated signal is supplied to a controlling circuit 158. The controlling circuit 158 controls the charging portion PS corresponding to the received signal.

Voltage detecting circuits 160 and 161 are disposed in parallel between the input terminals IN-AP and IN-BP. The voltage detecting circuit 160 supplies the detected voltage to the terminal TM-P through the switch 163. The voltage detecting circuit 161 supplies the detected voltage to the terminal TM-P through the switch 163. The switch 163 is controlled by a controlling circuit 159. The anode of a secondary battery BT is connected to the input terminal IN-AP. The cathode of the secondary battery BT is connected to the input terminal IN-BP through a switch 162.

The switching operation of the switch 163 for the detected voltages of the voltage detecting circuits 160 and 161 allows the above-described pulse signal to be supplied to the charging portion PS.

A voltage E152 detected by the voltage detecting circuit 152, a voltage E160 detected by the voltage detecting circuit 160, and a voltage E161 detected by the voltage detecting circuit 161 have the following relation.

$$E152 \leq E160 > E161$$

First of all, the regulator 151 is controlled by the voltage detecting circuit 152. The regulator 153 is controlled by the voltage detecting circuit 160. At this point, in the difference detecting circuit 156, the following relation is satisfied.

E152<E160 or E152=E160

Thereafter, the switching operation of the switch 163 is performed. The regulator 151 is controlled by the voltage detecting circuit 152. The regulator 153 is controlled by the voltage detecting circuit 161. At this point, in the difference detecting circuit 156, the following relation is satisfied.

E152>E161

When such a relation is satisfied, the charging portion PS is controlled.

Figure 18:
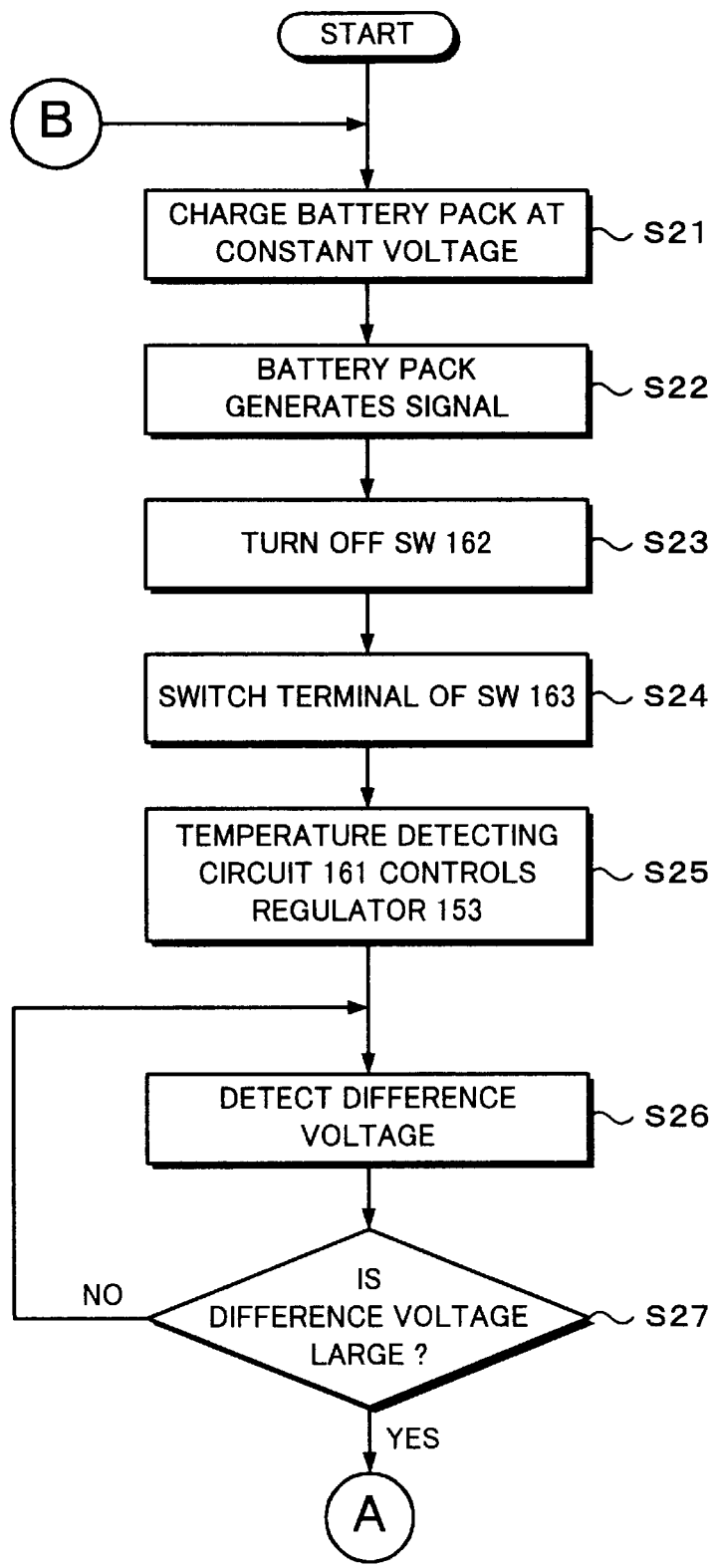
FIG. 18 is a first part of a flow chart showing an operation algorithm of the charging system according to the fourth embodiment of the present invention.
Figure 19:
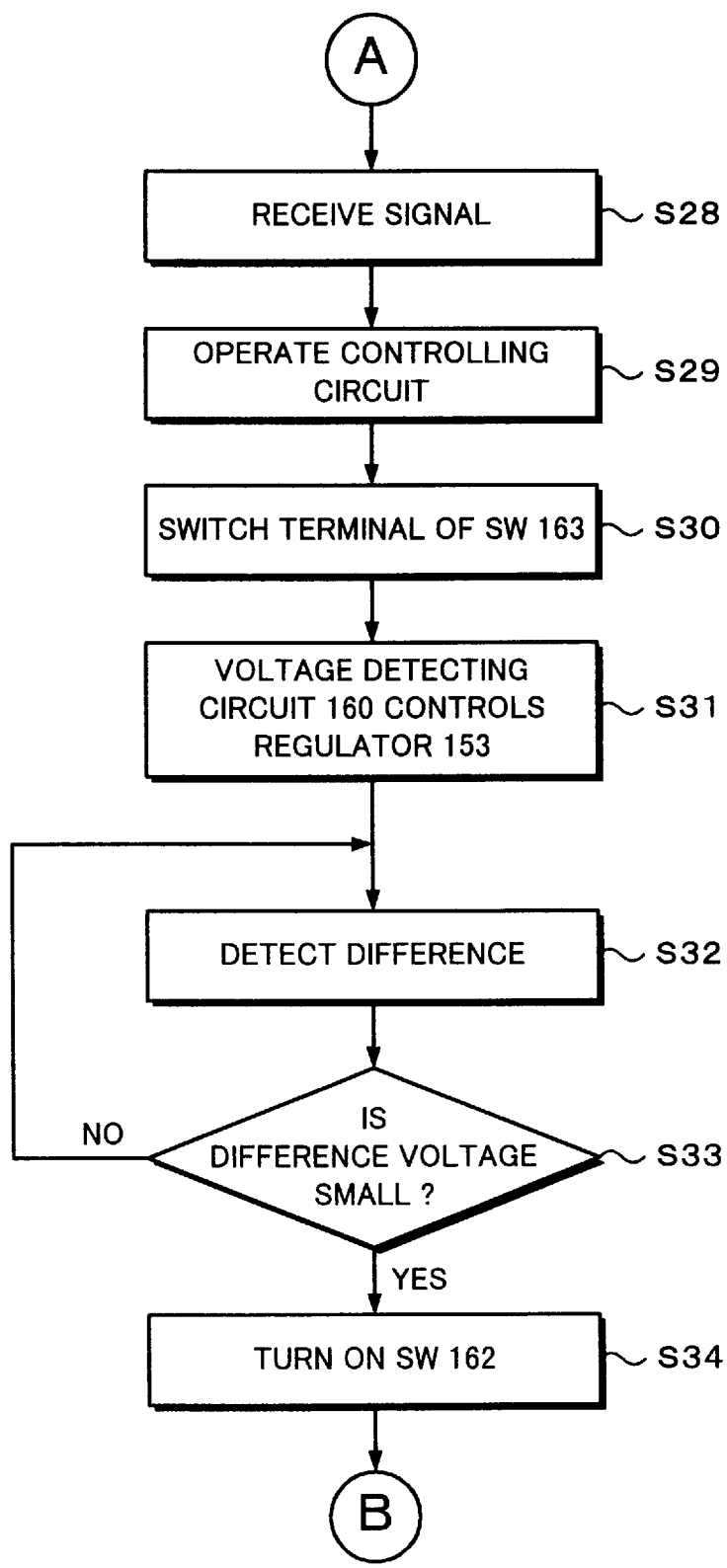
FIG. 19 is a second part of the flow chart shown in FIG. 18.

Next, with reference to a flow chart shown in FIGS. 18 and 19, an operation algorithm of the charging system according to the fourth embodiment shown in FIG. 17 will be described. At step S21, the charging portion PS starts charging the battery pack BP at a constant voltage. At step S22, the battery pack BP generates a signal. At step S23, the switch 162 is turned off. At step S24, the switching operation of the switch 163 is performed so as to switch the terminal that supplies the voltage detected by the voltage detecting circuit 160 to the terminal that supplies the voltage detected by the voltage detecting circuit 161. At step S25, the regulator 153 is controlled by the voltage detecting circuit 161.

At step S26, the difference detecting circuit 156 detects the difference voltage between the voltage received from the regulator 151 and the voltage received from the regulator 153. At step S27, it is determined whether or not the detected difference voltage is larger than a predetermined value. When the determined result at step S27 is Yes, the flow advances to step S28. When the determined result at step S27 is No, the flow advances to step S26. At step S28, the charging portion PS receives a signal. At step S29, the controlling circuit 159 operates.

At step S30, the switching operation of the switch 163 is performed so as to switch the terminal that supplies the voltage detected by the voltage detecting circuit 161 to the terminal that supplies the voltage detected by the voltage detecting circuit 160. At step S31, the regulator 153 is controlled by the voltage detecting circuit 160. At step S32, the difference detecting circuit 156 detects the difference voltage between the voltage received from the regulator 151 and the voltage received from the regulator 153. At step S33, it is determined whether or not the detected difference voltage is smaller than a predetermined voltage. When the determined result at step S33 is Yes, the flow advances to step S34. When the determined result at step S33 is No, the flow returns to step S32. At step S34, the switch 162 is turned on. Thereafter, the flow returns to step S21.

Figure 20:
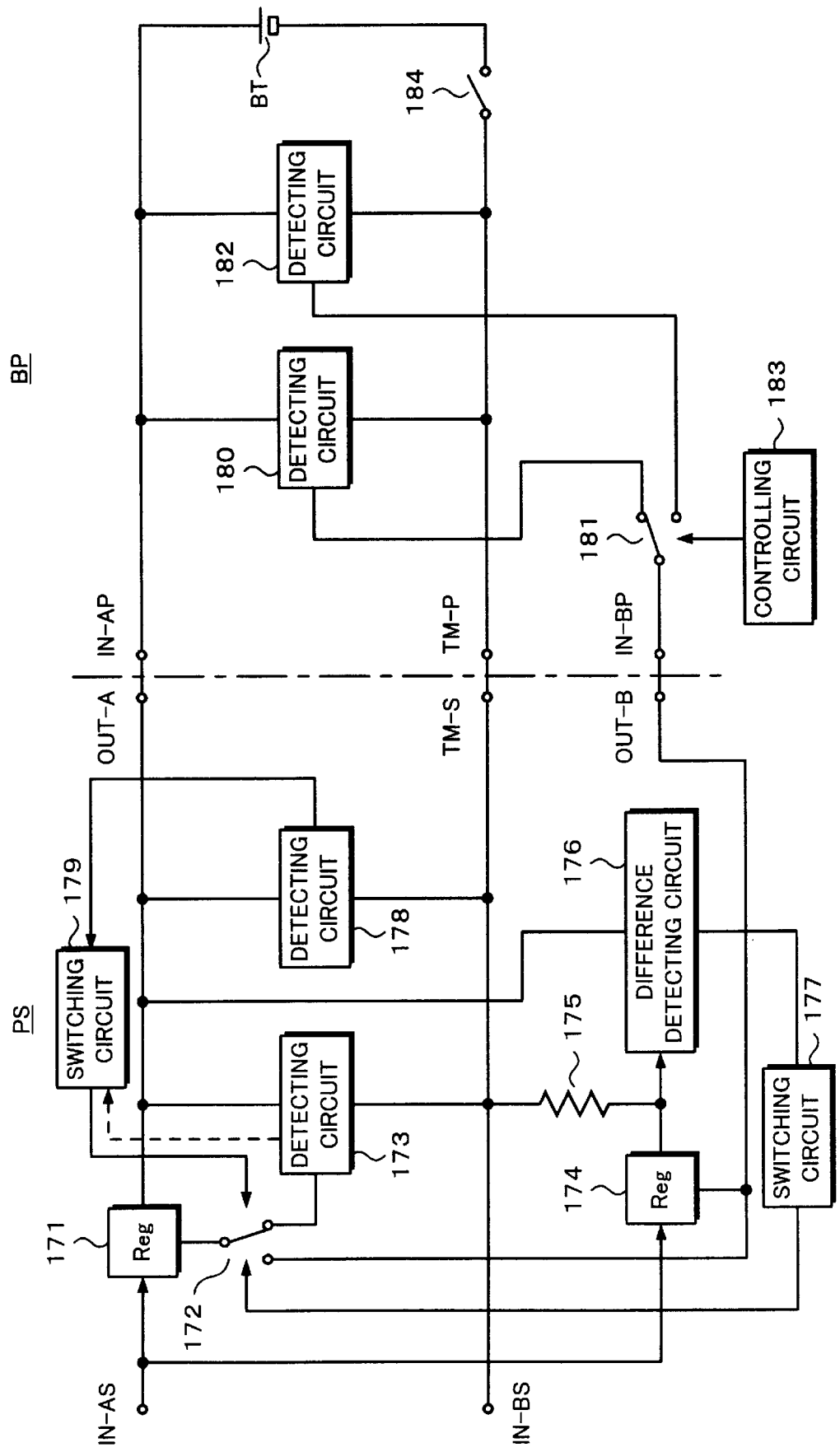
FIG. 20 is a block diagram showing the structure of a charging system according to a fifth embodiment of the present invention.

FIG. 20 is a block diagram showing the structure of a charging system according to a fifth embodiment of the present invention.

In FIG. 20, a regulator 171 is disposed between an input terminal IN-AS of a charging portion PS and an output terminal OUT-A. A control signal is supplied to the regulator 171 through a switch 172. An input terminal IN-BS of the charging portion PS is connected to an input terminal IN-BP of a battery pack BP through an output terminal OUT-B. Voltage detecting circuits 173 and 178 are disposed in parallel between the input terminals IN-AS and IN-BS. A voltage detected by the voltage detecting circuit 173 is supplied to a first input terminal of the switch 172. A voltage detected by the voltage detecting circuit 178 is supplied to a switching circuit 179. The switching circuit 179 generates a switching signal for switching the switch 172 corresponding to the received voltage. The switching operation of the switch 172 is controlled corresponding to the generated switching signal.

A first input terminal of a regulator 174 is connected to the input terminal IN-AS. A second input terminal of the regulator 174 is connected to a switch 181 through terminals TM-P and TM-S. An output terminal of the regulator 174 is connected to a difference detecting circuit 176. In addition, the output terminal of the regulator 174 is connected to the output terminal OUT-B through a resistor 175. The difference detecting circuit 176 detects the difference voltage between an output voltage of the regulator 171 and an output voltage of the regulator 174. The detected difference voltage is supplied to a switching circuit 177. The switching circuit 177 generates a switching signal corresponding to the supplied difference voltage. The switching operation of the switch 172 is controlled corresponding to the generated switching signal.

Voltage detecting circuits 180 and 182 are disposed in parallel between the input terminals IN-AP and IN-BP. The voltage detecting circuits 180 and 182 supply detected voltages to the charging portion PS through the switch 181 and the terminal TM-P. The switch 181 is controlled by a controlling circuit 183. The anode of a secondary battery BT is connected to the input terminal IN-AP. The cathode of the secondary battery BT is connected to the input terminal IN-BP through a switch 184.

According to the fifth embodiment, a voltage detected by the voltage detecting circuit 178 is supplied to the switching circuit 179. The switching operation of the switch 172 is performed corresponding to the received voltage. Alternatively, a voltage detected by the voltage detecting circuit 173 is supplied to the selecting circuit 179 as denoted by a dashed line shown in FIG. 20. In this case, the switching operation of the switch 172 is performed corresponding to the voltage received from the voltage detecting circuit 173. As another alterative method, the switching operation of the switch 172 may be performed corresponding to the voltage detected by the voltage detecting circuit 173 and the voltage detected by the voltage detecting circuit 178.

As described above, according to the fifth embodiment shown in FIG. 20, the switching operation of the switch 172 is performed according to the fourth embodiment (see FIG. 17), and the operations described in the second embodiment (see FIG. 14) and the third embodiment (see FIG. 15) can be accomplished.

Figure 21:
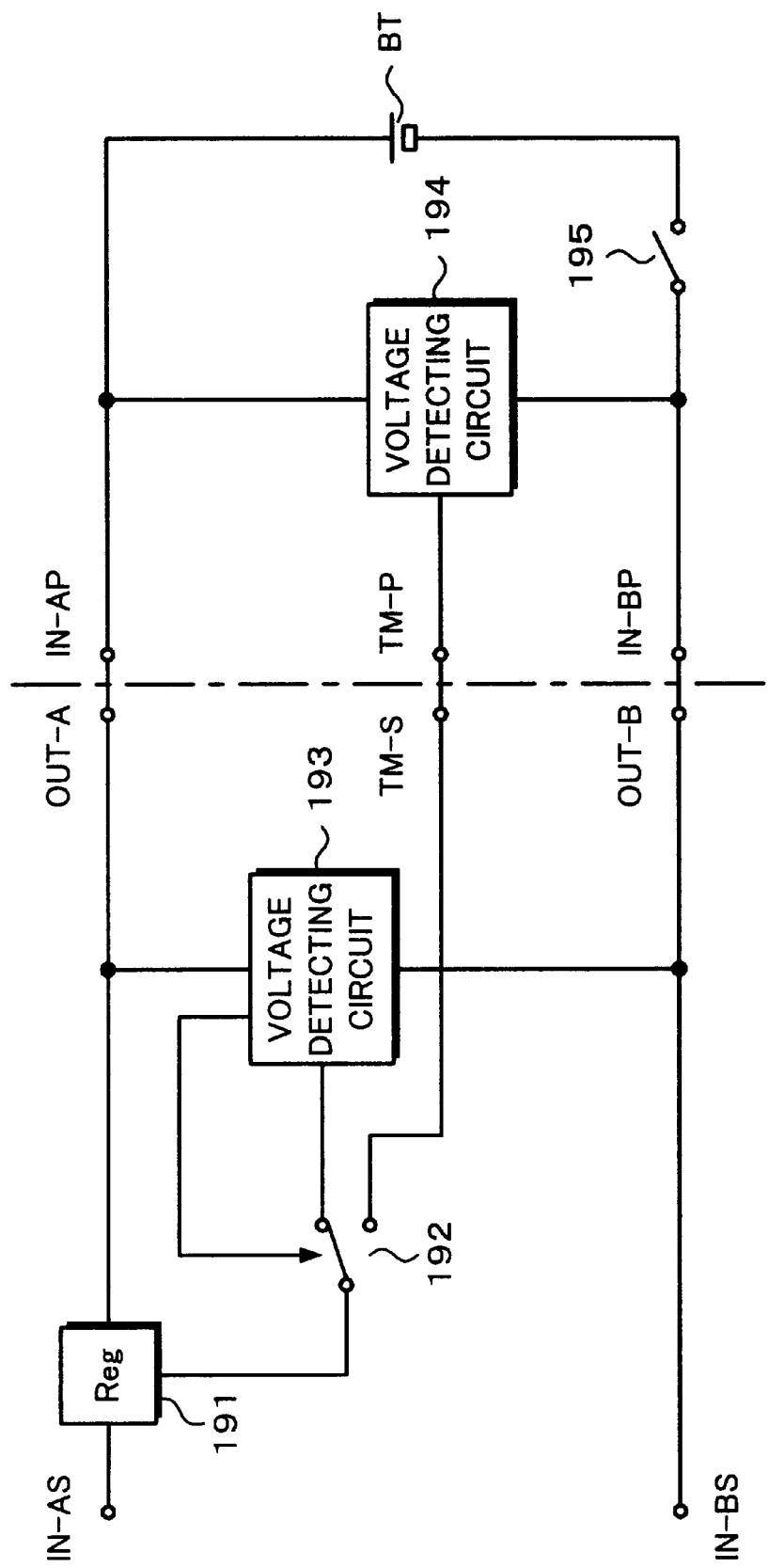
FIG. 21 is a block diagram showing an outlined structure of the charging system according to the fifth embodiment of the present invention.

FIG. 21 is a block diagram showing an outlined structure of the charging system according to the fifth embodiment of the present invention. A regulator 191 is disposed between an input terminal IN-AS of a charging portion PS and an output terminal OUT-A. A control signal is supplied to the regulator 191 through a switch 192. An input terminal IN-BS of the charging portion PS is connected to an input terminal IN-BP of the battery pack BP through an output terminal OUT-B. A voltage detecting circuit 193 is disposed between the output terminals OUT-A and OUT-B. A voltage detected by the voltage detecting circuit 193 is supplied to a first input terminal of the switch 192. In addition, the switching operation of the switch 192 is controlled corresponding to the voltage detected by the voltage detecting circuit 193. A second input terminal of the switch 192 is connected to a voltage detecting circuit 194 through terminals TM-P and TM-S. The voltage detecting circuit 194 is disposed between the input terminals IN-AP and IN-BP. A voltage detected by the voltage detecting circuit 194 is supplied to the terminal TM-P. The anode of a secondary battery BT is connected to the input terminal IN-AP. The cathode of the secondary battery BT is connected to the input terminal IN-BP through a switch 195.

When a voltage E193 detected by the voltage detecting circuit 193 and a voltage E194 detected by the voltage detecting circuit 194 satisfy the following relation:

$$E193 > E194$$

if the output voltage of the regulator 191 is equal to the voltage E193 detected by the voltage detecting circuit 193, the switching operation of the switch 192 is performed so that the voltage detecting circuit 193 controls the regulator 191. If the output voltage of the regulator 191 is smaller than the voltage E193, the switching operation of the switch 192 is performed so that the voltage detecting circuit 194 controls the regulator.

Figure 22:
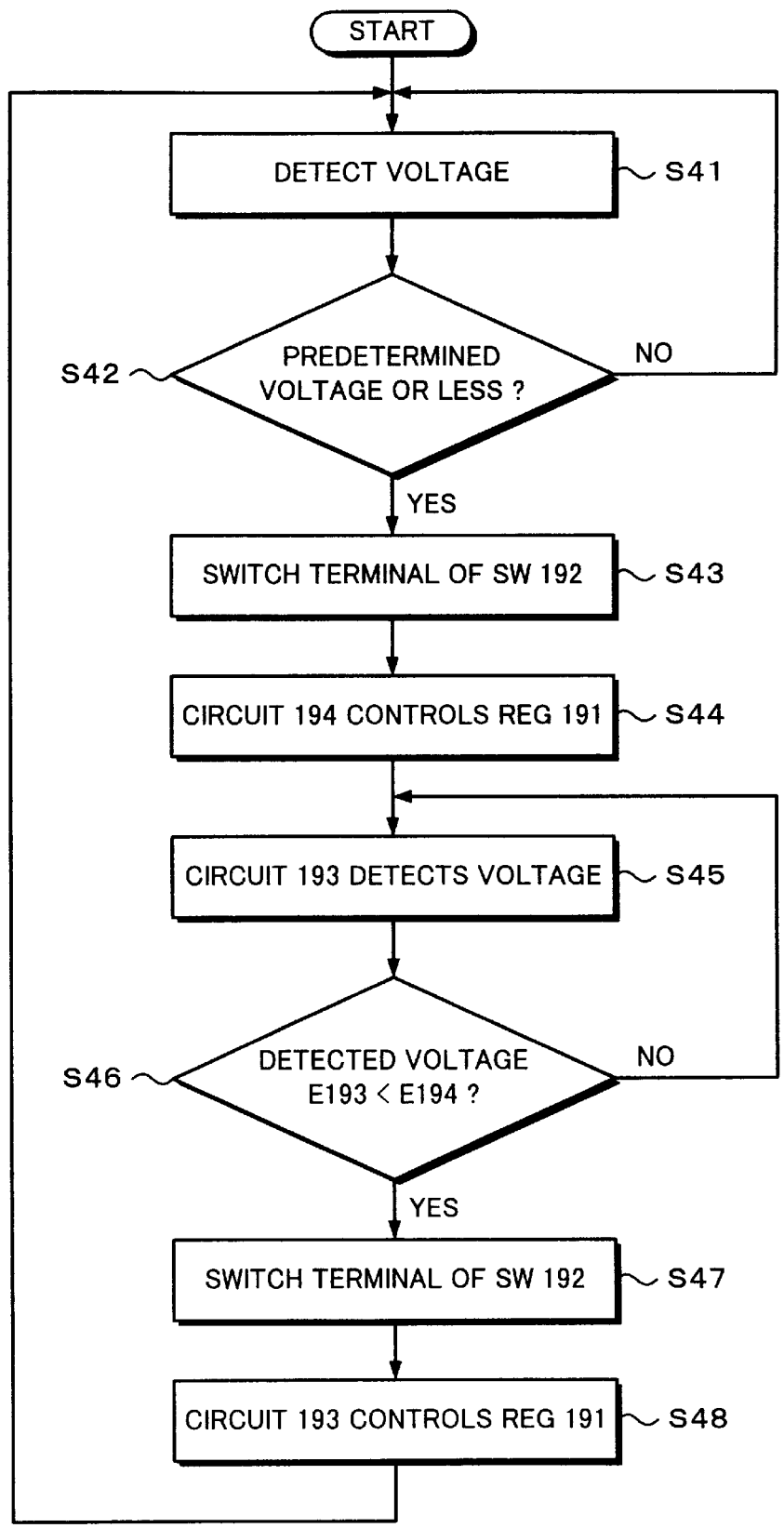
FIG. 22 is flow chart showing an operation algorithm of the charging system according to the fifth embodiment of the present invention.

Next, with reference to a flow chart shown in FIG. 22, an operation algorithm of the charging system according to the fifth embodiment of the present invention will be described. At step S41, the voltage detecting circuit 193 detects an output voltage of the charging portion PS. At step S42, it is determined whether or not the detected voltage is a predetermined voltage or less. When the determined result at step S42 is Yes, the flow advances to step S43. When the determined result at step S42 is No, the flow returns to step S41. At step S43, the switching operation of the switch 192 is performed. At step S44, the voltage detecting circuit 194 controls the regulator 191. At step S45, the voltage detecting circuit 193 detects a voltage. At step S46, it is determined whether or not the detected voltage is larger than the voltage E193 detected by the voltage detecting circuit 193. When the determined result at step S46 is Yes, the flow advances to step S47. When the determined result at step S46 is No, the flow returns to step S45. At step S47, the switching operation of the switch 192 is performed. At step S48, the voltage detecting circuit 193 controls the regulator 191. Thereafter, the flow returns to step S41.

Figure 23:
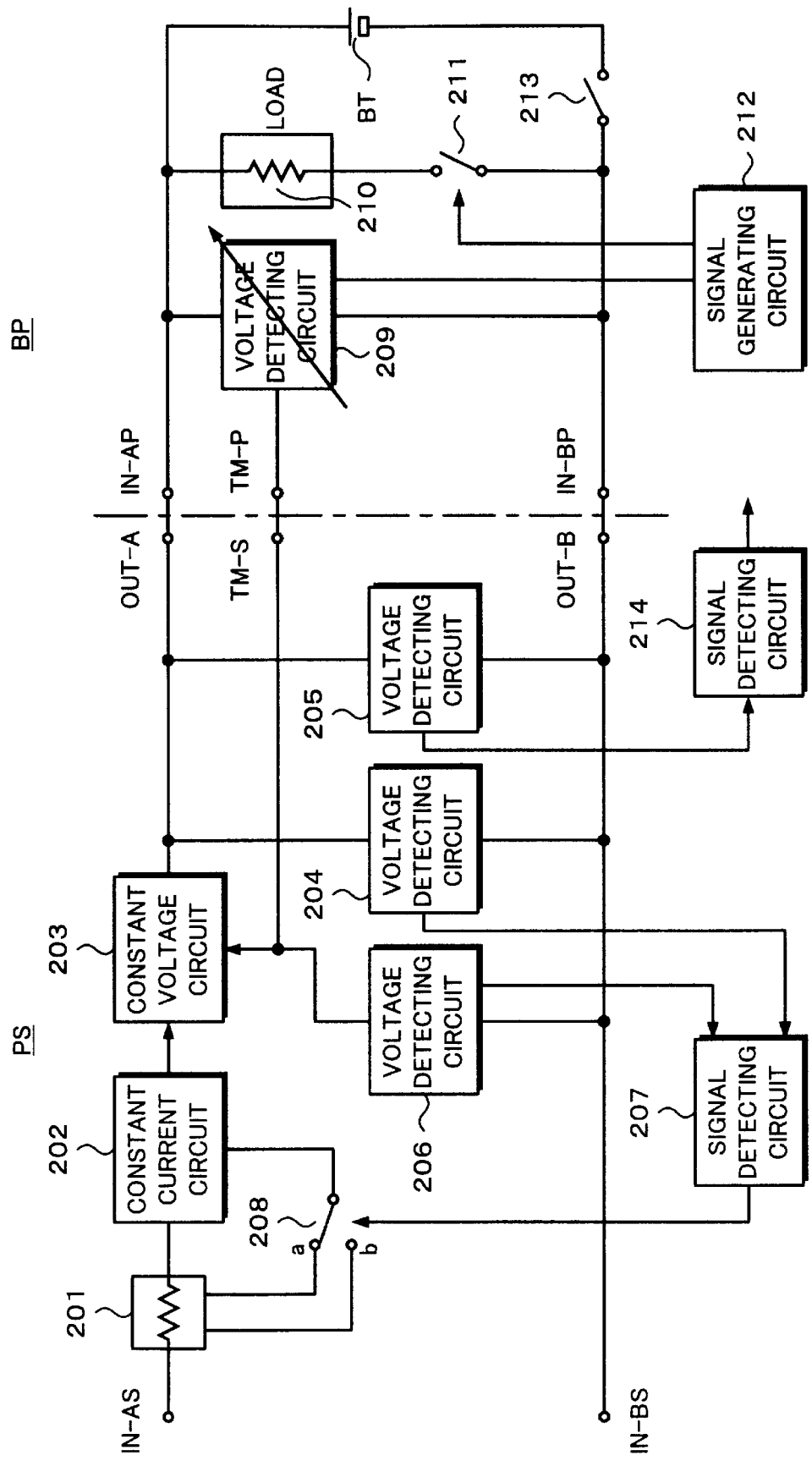
FIG. 23 is a block diagram showing the structure of a charging system according to a sixth embodiment of the present invention.
Figure 24:
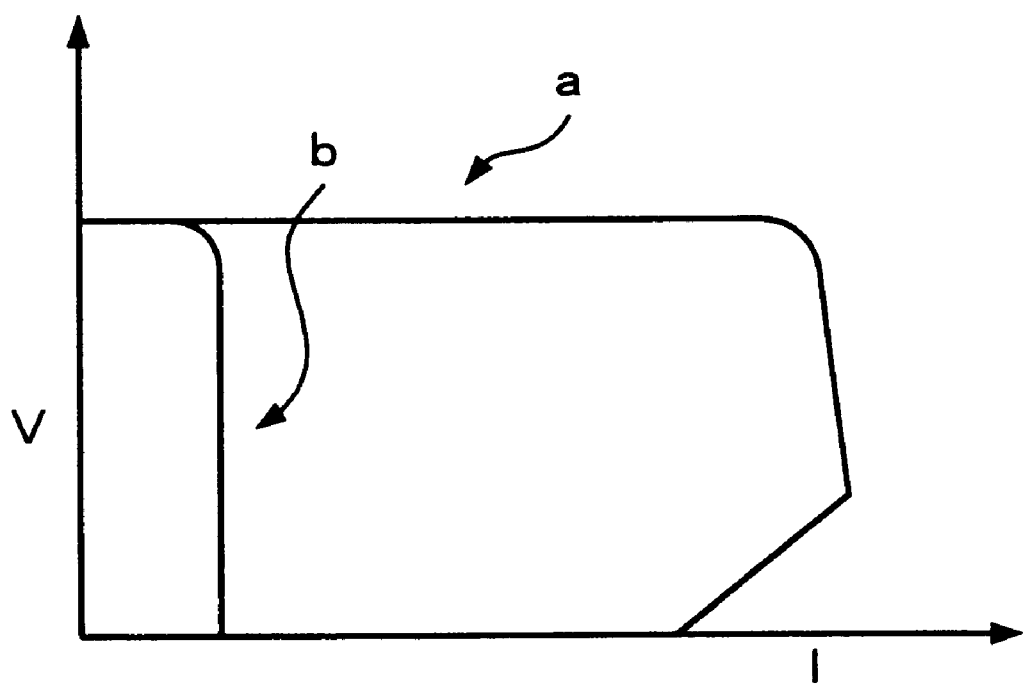
FIG. 24 is a graph for explaining voltage and current characteristics of the present invention.

FIG. 23 is a block diagram showing the structure of a charging system according to a sixth embodiment of the present invention. A resistor 201, a constant current circuit 202, and a constant voltage circuit 203 are disposed in series between an input terminal IN-AS of a charging portion PS and an output terminal OUT-A. The resistor 201 outputs two types of voltages and currents a and b as voltage/current characteristics shown in FIG. 24 to respective terminals a and b of a switch 208. The constant current circuit 202 is controlled corresponding to a current received from the switch 208. The constant voltage circuit 203 is controlled corresponding to a voltage received from a voltage detecting circuit 209 through terminals TM-P and TM-S. An input terminal IN-BS of the charging portion PS is connected to an output terminal OUT-B. Voltage detecting circuits 204 and 205 are disposed in parallel between the output terminals OUT-A and OUT-B. A voltage detecting circuit 206 is disposed between a terminal TM-S and the output terminal OUT-B.

The voltage detecting circuits 204 and 205 detect a voltage of the charging portion PS. A voltage detected by the voltage detecting circuit 204 is supplied to a signal detecting circuit 207. The voltage detecting circuit 206 detects a voltage difference between the terminal TM-S and the output terminal OUT-B. The detected voltage difference is supplied to the signal detecting circuit 207. The signal detecting circuit 207 detects a signal corresponding to the received voltage and voltage difference and generates a control signal for switching the switch 208 corresponding to the detected signal. A voltage detected by the voltage detecting circuit 205 is supplied to a signal detecting circuit 214. The signal detecting circuit 214 controls the charging portion PS corresponding to the received voltage.

The voltage detecting circuit 209 is disposed between input terminals IN-AP and IN-BP of a battery pack BP. A load resistor 210 and a switch 211 are connected in series between the input terminals IN-AP and IN-BP. A secondary battery BT and a switch 213 are disposed in series between the input terminals IN-AP and IN-BP. A signal generating circuit 212 switches a voltage detected by the voltage detecting circuit 209 and controls the on/off operation of the switch 211.

According to the sixth embodiment of the present invention, by varying the load of the battery pack BP, a signal is supplied to the charging portion PS.

Figure 25:
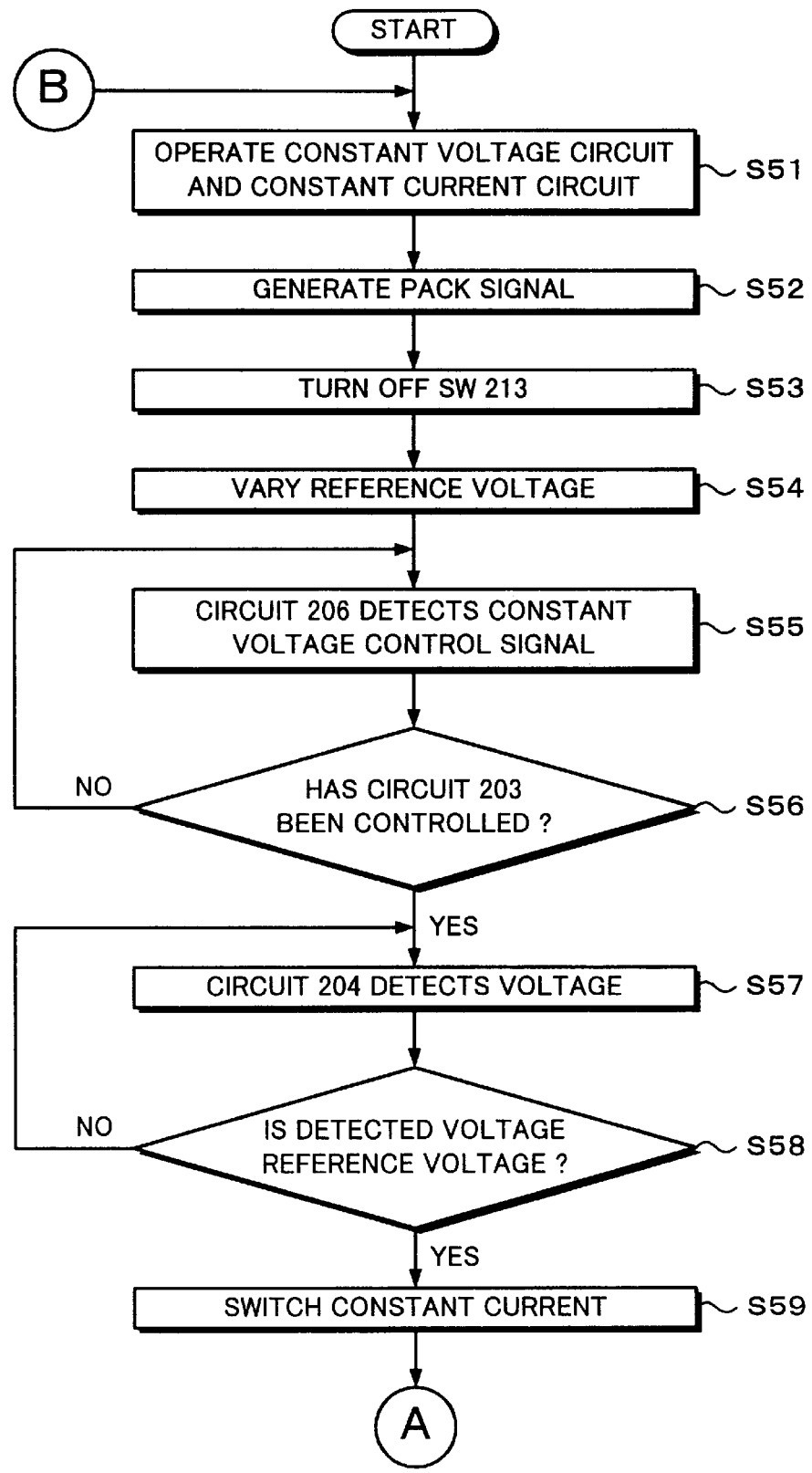
FIG. 25 is a first part of a flow chart showing an operation algorithm of the charging system according to a sixth embodiment of the present invention.
Figure 26:
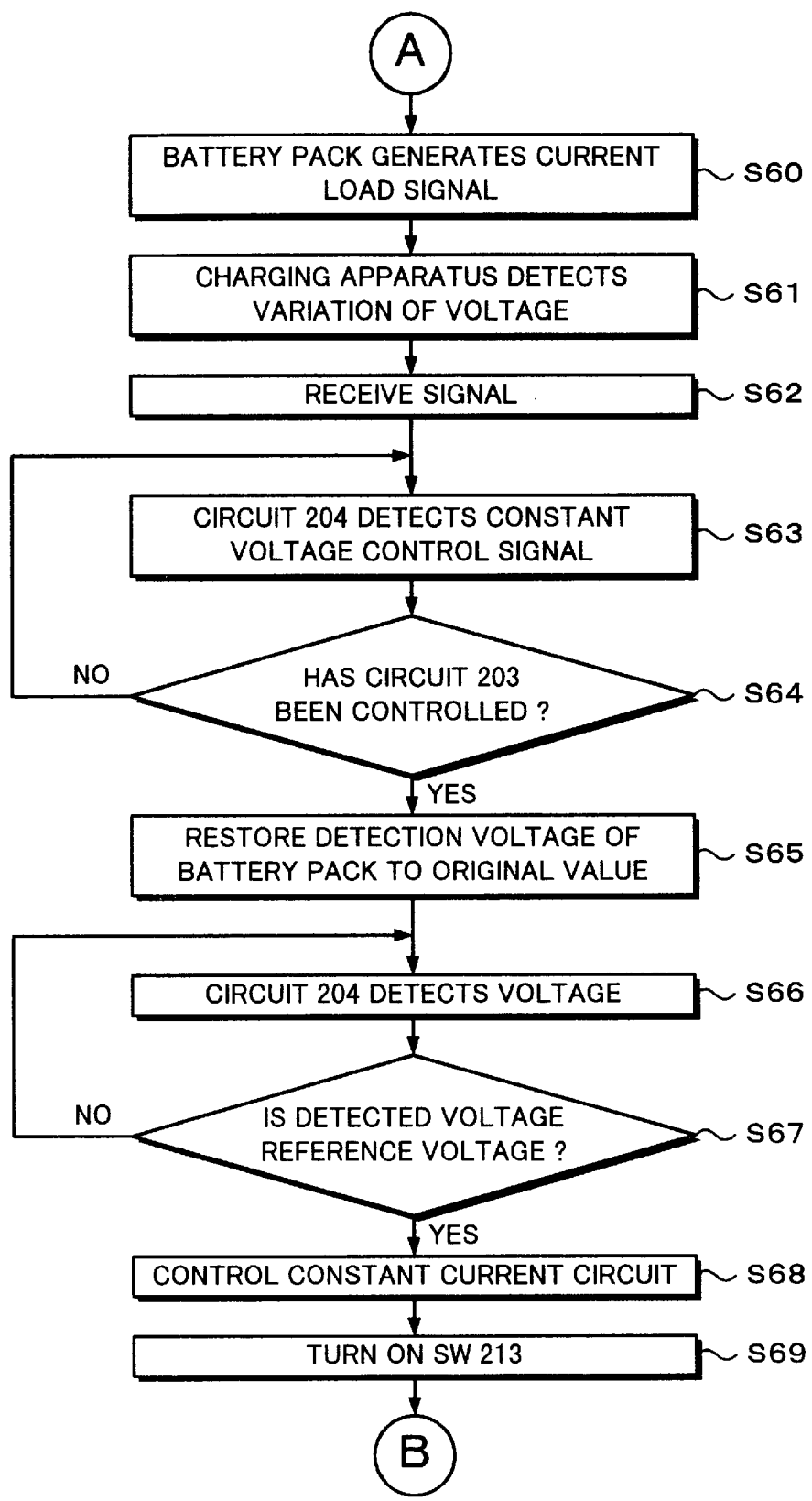
FIG. 26 is a second part of the flow chart shown in FIG. 25.

Next, with reference to a flow chart shown in FIGS. 25 and 26, an operation algorithm of the charging system according to the sixth embodiment of the present invention will be described. At step S51, the constant current circuit 202 and the constant voltage circuit 203 are operated. At step S52, the battery pack BP outputs a signal. At step S53, the switch 213 is turned off. At step S54, the reference voltage of the voltage detecting circuit 209 is varied. At step S55, the voltage detecting circuit 206 detects a control voltage for controlling the constant voltage circuit 203. At step S56, it is determined whether or not the constant voltage circuit 203 is controlled corresponding to the control voltage detected by the voltage detecting circuit 209. When the determined result at step S56 is Yes, the flow advances to step S57. When the determined result at step S56 is No, the flow advances to step S55.

At step S57, the voltage detecting circuit 204 detects a voltage. At step S58, it is determined whether or not the detected voltage is a reference voltage. When the determined result at step S58 is Yes, the flow advances to step S59. When the determined result at step S58 is No, the flow returns to step S57. At step S59, the switching operation of the switch 208 is performed so as to switch one of two types of currents that are output from the resistor 201 to the other type. The constant current circuit 202 is controlled corresponding to the other type of current. At step S60, the battery pack BP outputs a current load signal. At step S61, the voltage detecting circuit 205 detects a voltage variation of the charging portion PS. At step S62, the signal detecting circuit 214 receives the signal and controls the charging portion PS corresponding to the received signal.

At step S63, the voltage detecting circuit 204 detects a voltage. At step S64, it is determined whether or not the constant voltage circuit 203 is controlled corresponding to the detected voltage. When the determined result at step S64 is Yes, the flow advances to step S65. When the determined result at step S64 is No, the flow returns to step S63. At step S65, the reference voltage of the voltage detecting circuit 209 of the battery pack BP is restored to the original value. At step S66, the voltage detecting circuit 204 detects a voltage. At step S67, it is determined whether or not the detected voltage is the reference voltage. When the determined result at step S67 is Yes, the flow advances to step S68. When the determined result at step S67 is No, the flow returns to step S66.

At step S68, the switching operation of the switch 208 is performed so as to switch one of two types of currents that are output from the resistor 201 to the other type of current. The constant current circuit 202 is controlled corresponding to the other type of current. In other words, at step S68, the current controlling operation of the constant current circuit 202 is restored. At step S69, the switch 213 is turned on. Thereafter, the flow returns to step S51.

In each of the above-described embodiments, a control signal supplied to the charging apparatus (charging portion) and the load apparatus (battery pack) is generated corresponding to the temperature detected from the secondary battery BT of the load apparatus. Alternatively, a control signal may be generated corresponding to another factor other than the temperature detected from the secondary battery. For example, a control signal for controlling the charging/discharging operations may be generated corresponding to the battery voltage/current detected from the battery pack BP.

In each of the above-described embodiments, a lithium-ion battery as a secondary battery was exemplified. However, the present invention can be applied to charging systems for other secondary batteries that are charged at a constant voltage.

The temperature range depends on a secondary battery BT for use. Thus, a proper temperature should be set corresponding to characteristics of a battery for use. For example, in the case of a lithium-ion battery, the chargeable/dischargeable temperatures may vary depending on the structure, composition, and use conditions thereof.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A secondary battery apparatus, comprising:
   a first terminal for receiving one of a charging voltage and a charging current;
   a second terminal for outputting a control voltage and a control signal, the control voltage being generated based on the charging voltage and a reference voltage;
   a third terminal for receiving a common voltage;
   a secondary battery for receiving one of the charging voltage and the charging current;
   switching means connected to the third terminal for stopping a supply of one of the charging voltage and the charging current to the secondary battery;
   temperature detecting means for detecting a secondary battery temperature, wherein when said temperature detecting means detects a temperature exceeding a chargeable temperature range corresponding to the reference voltage the control signal is generated; and
   voltage selecting means for selecting the reference voltage corresponding to the secondary battery temperature detected by the temperature detecting means.

2. The secondary battery apparatus as set forth in claim 1, further comprising:
   current detecting means for detecting the charging current.

3. A charging system having a charging apparatus and a secondary battery apparatus connected to the changing apparatus via a first signal line, a second signal line, and a third signal line, wherein:
   the charging apparatus includes:
      a circuit portion for outputting one of a constant charging voltage and a constant charging current;
      a first terminal for outputting one of the constant charging voltage and the constant charging current to the secondary battery apparatus;
      a second terminal for receiving from the secondary battery apparatus a control voltage and a control signal, the control voltage and the control signal being supplied to the circuit portion; and
      a third terminal for supplying a common voltage to the secondary battery apparatus;
   the secondary battery apparatus includes:
      a secondary battery for receiving one of the constant charging voltage and the constant charging current through the first signal line;
      voltage detecting means for detecting the constant charging voltage and for supplying the control voltage and the control signal corresponding to the control voltage to the circuit portion through the second signal line, the control voltage being generated based on the constant charging voltage and a reference voltage;
      switching means for stopping a supply of one of the constant charging voltage and the constant charging current connected to the third signal line for supplying a common voltage;
      temperature detecting means for detecting a secondary battery temperature, wherein when the temperature detecting means detects a temperature exceeding a chargeable temperature range, the switching means stops supplying one of the constant charging voltage and the constant charging current to the secondary battery, changes the reference voltage, and generates the control signal corresponding to the control voltage, and the charging apparatus detects the control signal corresponding to the control voltage, determines that one of the constant charging voltage and the constant charging current is no longer supplied to the charging apparatus, and controls the circuit portion corresponding to the control voltage; and
      voltage selecting means for s electing the reference voltage corresponding to the secondary battery temperature detected by the temperature detecting means.

4. The charging system as set forth in claim 3, wherein the charging apparatus further comprises comparing means for comparing the constant charging voltage and the reference voltage.

5. The charging system as set forth in claim 3, wherein the secondary battery apparatus further comprises current detecting means for detecting the constant charging current.

6. The charging system as set forth in claim 3, wherein the control voltage is generated based on the constant voltage and reference voltage.

7. A charging method for a charging apparatus and a secondary battery apparatus connected to the charging apparatus via a first signal line, a second signal line, and a third signal line, comprising the steps of:
   outputting from the charging apparatus one of a constant charging voltage and a constant charging current;
   supplying to the secondary battery apparatus one of the constant charging voltage and the constant charging current through the first signal line;
   detecting by the secondary battery apparatus the constant charging voltage and supplying from the secondary battery apparatus a control voltage and a control signal to a circuit portion in the charging apparatus through the second signal line, the control voltage being generated based on the constant charging voltage and a reference voltage;

terminating a supply to the secondary battery apparatus of one of the constant charging voltage and the constant charging current via the third signal line used for supplying a common voltage to the secondary battery;

detecting by the secondary battery apparatus a secondary battery temperature and, when the detected temperature of the secondary battery apparatus exceeds a chargeable temperature range, selecting the reference voltage corresponding to the secondary battery temperature detected by the temperature detecting means, stopping, the secondary battery apparatus from supplying one of the constant charging voltage and the constant charging current to the secondary battery, and generating a control signal corresponding to the control voltage;

detecting by the charging apparatus the control signal corresponding to the control voltage;

determining by the charging apparatus that one of the constant charging voltage and the constant charging current are no longer supplied to the secondary battery; and controlling the circuit portion of the charging apparatus corresponding to the control voltage.

* * * * *